(12) United States Patent
Matsuike et al.

(10) Patent No.: US 9,060,030 B2
(45) Date of Patent: Jun. 16, 2015

(54) FRAME CONCATENATION APPARATUS

(71) Applicant: FUJITSU LIMITED, Kawasaki-shi (JP)

(72) Inventors: Mitsumasa Matsuike, Kawasaki (JP); Nobuhiro Rikitake, Machida (JP); Kazuhiro Ohnuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 13/788,297

(22) Filed: Mar. 7, 2013

(65) Prior Publication Data

US 2013/0182720 A1 Jul. 18, 2013

Related U.S. Application Data

(63) Continuation of application No. PCT/JP2010/065314, filed on Sep. 7, 2010.

(51) Int. Cl.
  H04L 1/02 (2006.01)
  H04L 29/06 (2006.01)
  G06F 9/00 (2006.01)
  H04L 12/931 (2013.01)

(52) U.S. Cl.
  CPC ...... *H04L 69/22* (2013.01); *G06F 9/00* (2013.01); *H04L 49/00* (2013.01)

(58) Field of Classification Search
  USPC .......................... 370/255, 235, 229, 230, 474
  See application file for complete search history.

(56) References Cited

U.S. PATENT DOCUMENTS

| | | | | |
|---|---|---|---|---|
| 6,894,999 | B1 * | 5/2005 | Acharya | 370/352 |
| 7,742,480 | B2 * | 6/2010 | Calvignac et al. | 370/392 |
| 2002/0083190 | A1 | 6/2002 | Kamiya et al. | |
| 2002/0199021 | A1 * | 12/2002 | Beier | 709/246 |
| 2003/0147393 | A1 | 8/2003 | Stewart | |
| 2003/0210673 | A1 | 11/2003 | Nishimura | |
| 2004/0179475 | A1 | 9/2004 | Hwang et al. | |
| 2005/0114489 | A1 | 5/2005 | Yonge, III et al. | |
| 2005/0249222 | A1 * | 11/2005 | van Kampen et al. | 370/395.5 |
| 2006/0031925 | A1 | 2/2006 | Natarajan et al. | |
| 2006/0120341 | A1 | 6/2006 | Del Prado Pavon et al. | |
| 2006/0153203 | A1 * | 7/2006 | Del Prado Pavon et al. | 370/400 |

(Continued)

FOREIGN PATENT DOCUMENTS

| | | |
|---|---|---|
| CN | 1731725 | 2/2006 |
| CN | 1806418 | 7/2006 |

(Continued)

OTHER PUBLICATIONS

Notification of Transmittal of Translation of The International Preliminary Report on Patentability (Form PCT/IB/338), International Application No. PCT/JP2010/065314, 8 pages, dated Apr. 18, 2013.

(Continued)

*Primary Examiner* — Edan Orgad
*Assistant Examiner* — Sithu Ko
(74) *Attorney, Agent, or Firm* — Fujitsu Patent Center

(57) ABSTRACT

A frame concatenation apparatus includes a storage unit to store a plurality of frames to be transmitted, a generation unit to generate a concatenated frame including the plurality of frames read out from the storage unit and serially concatenated, and including frame length information on each frame attached thereto, and an attachment unit to attach information for establishing synchronization with a receiver of the concatenated frame, to the concatenated frame.

17 Claims, 21 Drawing Sheets

(56) References Cited

U.S. PATENT DOCUMENTS

| | | |
|---|---|---|
| 2007/0112972 A1 | 5/2007 | Yonge, III et al. |
| 2007/0116000 A1* | 5/2007 | Ikeda et al. ............ 370/392 |
| 2008/0080524 A1 | 4/2008 | Tsushima et al. |
| 2009/0296738 A1 | 12/2009 | Shimada |

FOREIGN PATENT DOCUMENTS

| | | |
|---|---|---|
| JP | 2002-198994 | 7/2002 |
| JP | 2003-324445 | 11/2003 |
| JP | 2004-282740 | 10/2004 |
| JP | 2005-517328 | 6/2005 |
| JP | 2006-527570 | 11/2006 |
| JP | 2007-515113 | 6/2007 |
| JP | 2009-290744 | 12/2009 |
| JP | 2010-119043 | 5/2010 |
| WO | 2005/122503 A1 | 12/2005 |

OTHER PUBLICATIONS

International Search Report, mailed in connection with PCT/JP2010/065314 and mailed Nov. 22, 2010.

Notice of Reason for Rejection dated Feb. 4, 2014 with its English translation issued in the corresponding Japanese Application No. 2012-532760.

CNOA—First Office Action dated Sep. 28, 2014 and the Search Report attached thereto with English translations issued in the corresponding Chinese application No. 201080068991.7.

* cited by examiner

FIG. 3

| MAC ADDRESS | PORT NUMBER |
|---|---|
| A | 1 |
| B | 2 |
| C | 3 |

FIG. 7

| CONCA-TENA-TION SCHEME | b0 | b1 | b2 | b3 | b4 | b5 | b6 | b7 | b8 | b9 | b10 | b11 | b12 | b13 | b14 | b15 |
|---|---|---|---|---|---|---|---|---|---|---|---|---|---|---|---|---|
| | FRAME LENGTH | | | | | | | | | | | | | | | |

FIG. 8

| b0 | b1 | MEANINGS |
|---|---|---|
| 0 | 0 | CONCATENATION OF MAC FRAMES HAVING DIFFERENT DAS (FOURTH PROCESS) |
| 0 | 1 | CONCATENATION OF MAC FRAMES HAVING THE SAME DA (FIRST PROCESS) |
| 1 | 0 | CONCATENATION OF MAC FRAMES HAVING THE SAME VLAN ID (SECOND PROCESS) |
| 1 | 1 | CONCATENATION OF MAC FRAMES HAVING THE SAME DA AND THE SAME VLAN ID (THIRD PROCESS) |

FIG. 18

| CONCA-TENATION SCHEME | RE-WRI-TING | | | | | | | | | | | | | | |
|---|---|---|---|---|---|---|---|---|---|---|---|---|---|---|---|
| b0 | b1 | B2 | b3 | b4 | b5 | b6 | b7 | b8 | b9 | b10 | b11 | b12 | b13 | b14 | b15 |

FRAME RENGTH

FRAME CONCATENATION APPARATUS

CROSS-REFERENCE TO RELATED APPLICATION

This application is a continuation application of International Application PCT/JP2010/065314 filed on Sep. 7, 2010 and designated the U.S., the entire contents of which are incorporated herein by reference.

FIELD

The disclosure relates to a frame concatenation apparatus.

BACKGROUND

There have been facilities referred to as "data centers" in recent years, which manage a plurality of servers and storages, and provide connection lines to the Internet, and maintenance and operation services.

In a data center, a plurality of servers, storages and the like are installed in a plurality of racks. A Layer 2 (L2) switch, which is referred to as "top-of-rack switch," is installed at an ingress on a communication line of each rack. Each top-of-rack switch is connected to each of the plurality of servers or the plurality of storages that are accommodated in the rack, via a downlink line. In contrast, each top-of switch is connected to a router connected to the Internet, via an uplink line.

A plurality of virtual machines (VMs) are deployed in one or more physical servers accommodated in the rack, and operating efficiency of the data center may be increased in proportion to operating rates of the physical servers or the VMs. Accordingly, the top-of-rack switch desirably has no free port.

A current mainstream A L2 switch, which is a current mainstream, for the data center includes 1-Gbps×44 to 48 ports on the downlink side, and 10-Gbps×4 ports on the uplink side. In other words, in the current state, if all the ports of the top-of-rack switch are caused to operate, an amount of traffic on the downlink side exceeds an amount of traffic on the uplink side, which does not provide non-blocking communication. In other words, a process for sending the whole traffic on the downlink side to the uplink side cannot be performed, which may result in a frame being discarded.

Patent document 1: Japanese Laid-open Patent Publication No. 2002-198994

Patent Literature 2: Japanese Laid-open Patent Publication No. 2005-517328

In order to solve the above problem, for example, it is conceivable to increase the number of ports on the uplink side. The increase in the number of ports, however, leads to an increase in cost of the L2 switch, and thus is not preferred.

The above problem is a problem that may occur not only in the L2 switch used as the above top-of-rack switch, but also in the case where the maximum amount of upstream traffic exceeds the maximum amount of downstream traffic in a relay apparatus. Moreover, regardless of a situation as above, application of a communication scheme with good data transmission efficiency is generally desired.

SUMMARY

An embodiment of the present invention is a frame concatenation apparatus includes:
a storage unit to store a plurality of frames to be transmitted;
a generation unit to generate a concatenated frame including the plurality of frames read out from the storage unit and serially concatenated and including frame length information on each frame attached thereto; and
an attachment unit to attach information for establishing synchronization with a receiver of the concatenated frame, to the concatenated frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a MAC address table.

FIG. 7 illustrates a format of a Length field included in the concatenated frame illustrated in FIG. 6.

FIG. 8 is a table illustrating correspondences between concatenation codes included in the Length field, and concatenation types.

FIG. 18 illustrates a data structure example of the Length field in the second embodiment.

DESCRIPTION OF EMBODIMENTS

Embodiments of the present invention will be described below with reference to the drawings. The embodiments will be described by way of illustration, and the present invention is not limited to configurations of the embodiments.

First Embodiment

Configuration Example of Network System

Figure 1:
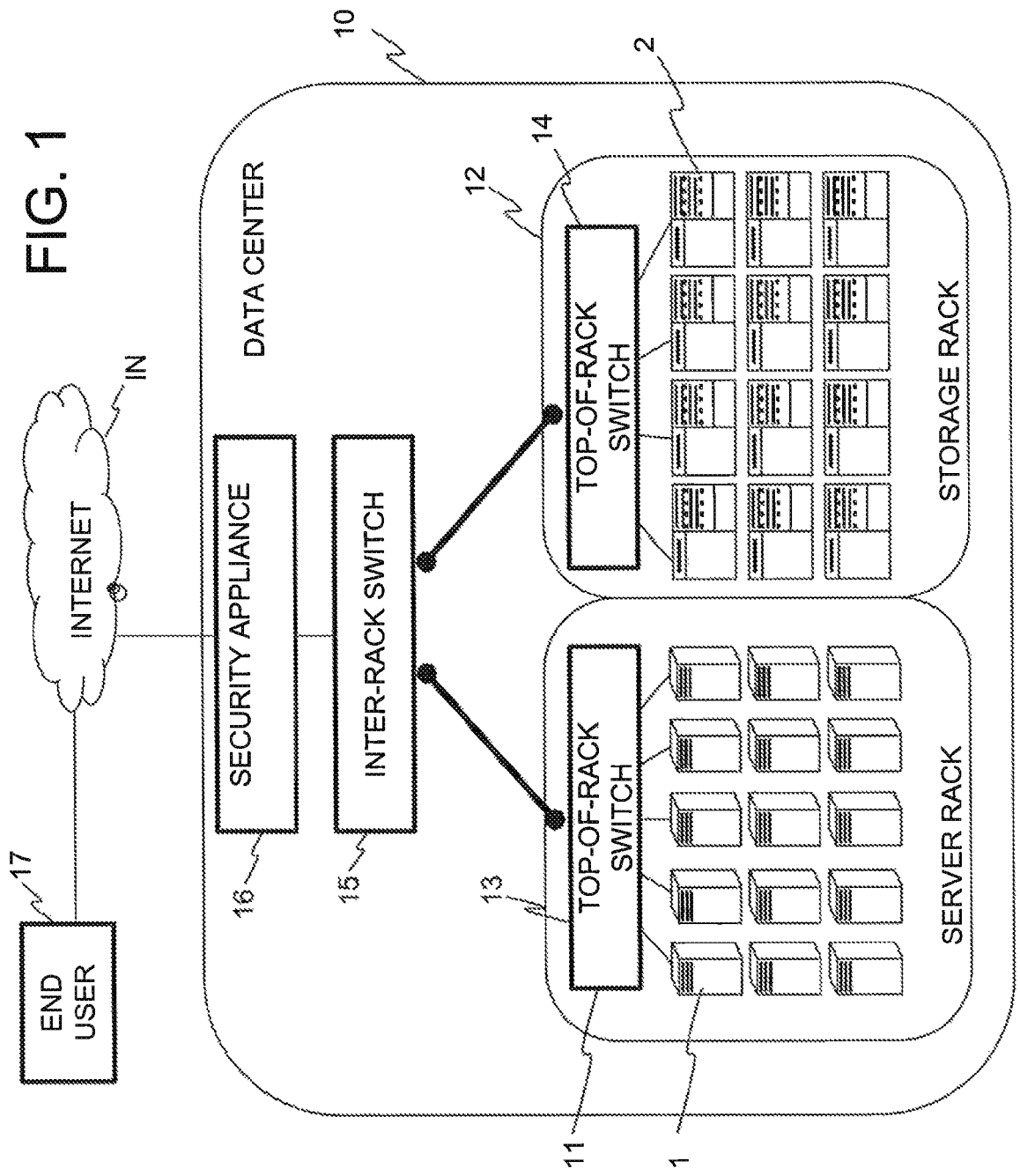
FIG. 1 illustrates a configuration example of a network system including a data center.

FIG. 1 illustrates a configuration example of a network system including a data center in an embodiment. In FIG. 1, a data center 10 includes areas referred to as "racks," which accommodate a plurality of servers or storages. An example illustrated in FIG. 1 illustrates a server rack 11 with a plurality of servers (server machines) 1 accommodated therein, and a storage rack 12 with computers (server machines) accommodated therein. The computers function as plurality of storages 2. A plurality of virtual machines (VMs) may be deployed in the server machine, that is, a physical server functioning as the server 1 or the storage 2. In other words, one virtual machine may also operate as the server (server machine) 1 or the computer (server machine) functioning as the storage 2.

An L2 switch 13 is installed in the server rack 11. The L2 switch 13 is connected to each of the plurality of server machines 1 via a communication line (downlink) and functions as a top-of-rack switch. In contrast, an L2 switch 14 is installed in the storage rack 12. The L2 switch 14 is connected to each of the plurality of storages 2 via a communication line (downlink) and functions as a top-of-rack switch.

Each of the L2 switches 13 and 14 is connected to an L2 switch 15 functioning as an inter-rack switch, via a communication line (uplink). The L2 switch 15 is connected to the Internet IN via a dedicated communication apparatus referred to as "security appliance" (security appliance 16), in which security functions, such as a firewall, a virus gateway and a spam e-mail filter, and router functions are integrated.

An end user (terminal device) 17 connected to the Internet IN may access the servers 1 and the storages 2 within the data center 10 via the Internet IN, and may be provided with desired network services and data. The L2 switches 13, 14 and 15 relay MAC frames in exchange (data transmission and reception) between the end user 17 and the servers 1 or the storages 2.

Each of the L2 switches 13 and 14 illustrated in FIG. 1 includes 1-Gbps×44 ports on the downlink side, and 10-Gbps×4 ports on the uplink side. The L2 switch 15 includes 10-Gbps×8 ports on the downlink side, and 10-Gbps×4 ports on the uplink side.

Figure 2:
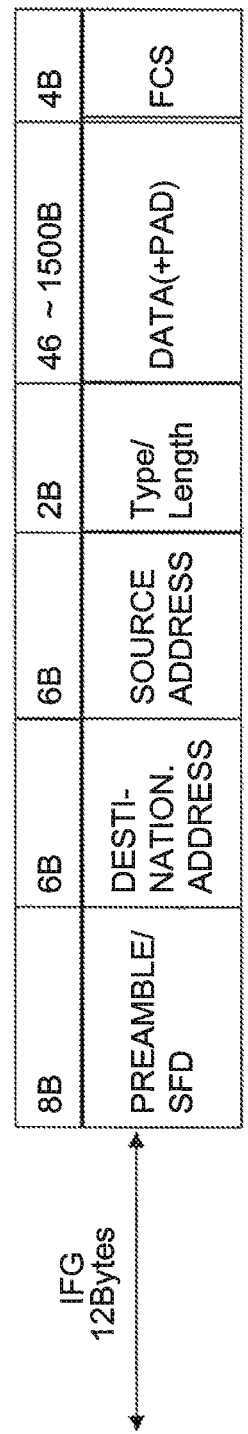
FIG. 2 illustrates a Media Access Control (MAC) frame format of the Ethernet (registered trademark).

Here, a Media Access Control (MAC) frame used for transmitting and receiving data between the L2 switches will be described. FIG. 2 illustrates a standard MAC frame format.

As illustrated in FIG. 2, when MAC frames are continuously sent out, an interval of 12 bytes, which is referred to as "Inter-Frame Gap (IFG)," is provided between the MAC frames.

A signal, which is referred to as "preamble/start frame delimiter (SFD)," is stored in an area (field) of 8 bytes from the beginning of the MAC frame. The preamble/SFD is used to detect the beginning of the MAC frame when synchronization is established in MAC transmission. The preamble is a signal including 7 bytes of contiguous signals each having a bit string "10101010." Moreover, the SFD is a 1-byte signal having a bit string "10101011."

As next fields of the preamble/SFD, 6-byte fields used as a destination address (DA) field and a source address (SA) field, respectively, are provided. A destination address of the MAC frame is stored in the DA field. A source MAC address is stored in the SA field.

As a next field of the SA field, a Type/Length field (2 bytes) is provided. When 2 bytes of the Type/Length field take a value of 1500 or less, the value of the Type/Length field represents a user data length (Length). In contrast, when 2 bytes of the Type/Length field take a value of 1536 or more, the value of the Type/Length field represents a protocol type of an upper layer protocol. Main values (protocol types) represented by the Type include 0x0800 (IP), 0x0806 (ARP), 0x8100 (802.1Q Tagged VLAN) and the like.

User data in upper layers of MAC is stored in a data portion (data field) following the Type/Length field. The length of the data portion is 46 to 1500 bytes. When the length of the data portion is less than 46 bytes, the data portion is filled with padding (PAD) so that the length is adjusted to be 46 bytes.

A value obtained by calculating Cyclic Redundancy Check (CRC) 32 for the MAC frame except the preamble is stored in a Frame Check Sequence (FCS) field (4 bytes). When the MAC frame is transmitted, the FCS is added to the MAC frame. The FCS is also calculated at a receiver. A bit error is detected depending on whether or not the values are consistent with each other.

MAC learning (MAC address learning), forwarding (MAC forwarding) and flooding operations, which are executed in transmission and reception of the MAC frame between the L2 switches, will be described next.

A MAC device to control the MAC frame monitors the preamble and the SFD in a received signal. When the preamble and the SFD is detected, the MAC device detects a MAC frame including this preamble and this SFD. The MAC device performs FCS check (CRC check) for the detected MAC frame.

The MAC device next detects a port number that the MAC frame has entered, and the source MAC address, learns that the source MAC address exists in that port, and registers them into a MAC address table (MAC address learning).

The MAC device finds a destination port of the MAC frame, from the MAC address table that has already been constructed through the learning. When the destination port is found, the MAC device sends out the MAC frame from the destination port (MAC forwarding). In contrast, when the destination port is not found, the MAC device transmits the MAC frame to a network (all ports) in which the MAC frame exists (flooding).

Moreover, when a device having the MAC address is replaced, the MAC address of the device is changed (the MAC address is an address unique to the device). Accordingly, the MAC address table is updated with the replacement of the device. In the update of the MAC address table, information existing on the MAC table for a certain period is deleted. Such a process is referred to as "aging."

Figure 3:
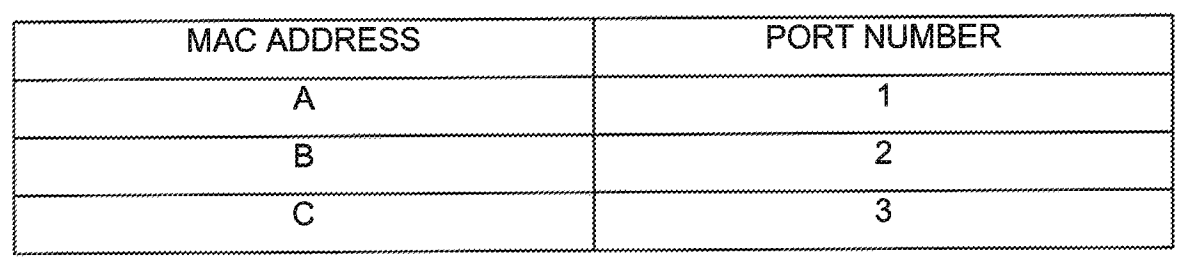

FIG. 3 illustrates an example of the MAC address table. In FIG. 3, the MAC address is simplified to be represented in one character. The example illustrated in FIG. 3 indicates that a device having the MAC address "A" exists for the port number "1." In this case, a frame with a destination "A" is transmitted to the port "1." Through the above MAC address learning, a newly learned combination of the MAC address and the port number is added to the MAC address table. When a destination MAC address does not exist on the MAC address table, the MAC frame is transmitted to all the ports on the same network as described above.

In the data center in the network system illustrated in FIG. 1, increases in operating rates of the servers 1 and the storages 2 are desired. In this case, it is conceivable to cause all the ports on the downlink side and the uplink side to operate in the L2 switches 13 and 14 functioning as the top-of-rack switches.

When, however, all the ports are put into an operating state, each of the L2 switches 13 and 14 is put into a state where each switch sends out data (MAC frame) incoming from the downlink side at 44 Gbps, to the uplink side at 40 Gbps. In other words, data relay is not performed in a non-blocking manner.

For this reason, it is conceivable to add a 10-Gbps port to the uplink side of each of the L2 switches 13 and 14. The addition of the port, however, causes an increase in cost and thus cannot be easily performed. Accordingly, it is conceivable to improve transmission efficiency of the network, for example, Ethernet (registered trademark), to which the MAC frame is transferred.

In the specifications of Ethernet (registered trademark) in the current state, that is, the protocol relating to the MAC frame transfer, however, the Inter-Frame Gap (IFG) of 12 bytes, and further the preamble and the SFD of 8 bytes are inserted into each MAC frame to be transmitted. The IFG, the preamble and the SFD consume a band to be used for transmitting an actual MAC frame (the DA, the SA, the Type/Length and the data portion).

Accordingly, when a MAC frame of 64 bytes is transmitted, sending efficiency for a physical band of the MAC frame is $64/(64+12+8) \approx 0.76$. This maximum efficiency cannot be avoided according to the conventional Ethernet (registered trademark) scheme (MAC frame format).

In the embodiment, accordingly, a method of increasing MAC frame transmission efficiency will be described in which improvement is added to the standard MAC frame format while a plurality of MAC frames are combined (concatenation) so that the preambles and the SFDs associated with some MAC frames may be omitted.

<Configuration Example of L2 Switch>

Figure 4:
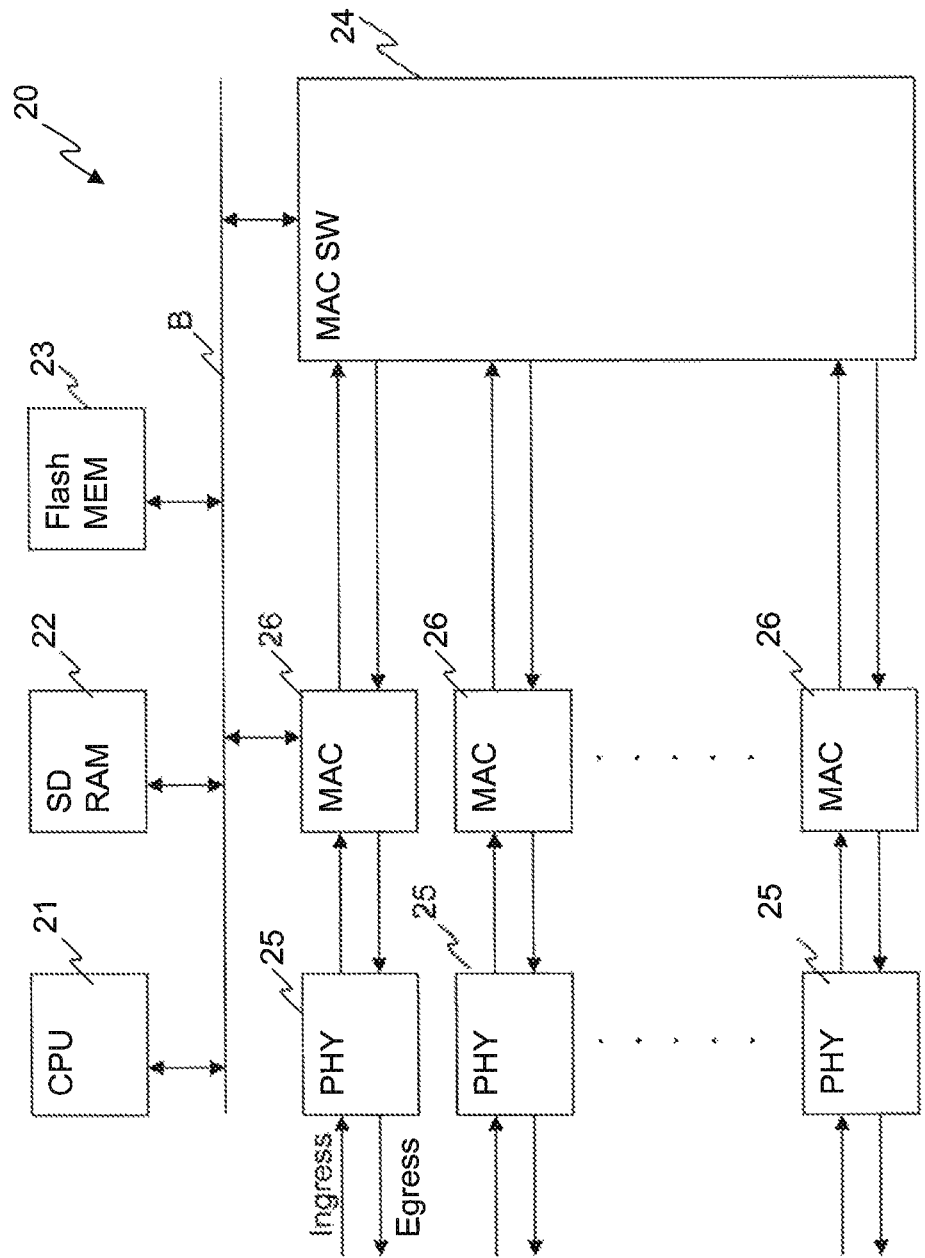
FIG. 4 illustrates a configuration example of an L2 switch.

FIG. 4 illustrates a configuration example of the L2 switch. In FIG. 4, an L2 switch 20 is applicable as the L2 switches 13, 14 and 15 illustrated in FIG. 1. The L2 switch 20 includes a Central Processing Unit (CPU) 21, an SDRAM 22 and a flash memory (Flash MEM) 23.

The L2 switch 20 also includes a MAC switch 24 connected to the CPU 21, the SDRAM 22 and the flash memory 23 via a bus B, and includes a plurality of pairs of a PHY chip (PHY device) 25 and a MAC chip (MAC device) 26, which are connected to the MAC switch 24. Each of the plurality of pairs of the PHY chip 25 and the MAC chip 26 is separated into the downlink side and the uplink side each being capable of accommodating one or more ports. Each MAC chip 26 is further connected to the CPU 21 via the bus B.

The CPU 21 controls operations of entire of the L2 switch 20 by executing various programs such as an operating system (OS) and a program for controlling the MAC chip 26, which are stored in the flash memory 23. The CPU 21, for example, particularly controls operations of the MAC chip (a MAC concatenation process (to be described later)) in the MAC frame relay. The SDRAM 22 is used as a work area for the CPU 21. The flash memory 23 functions as a boot memory used in a process for booting the L2 switch, and also stores the various programs such as the OS, and data used in the execution of the programs.

The PHY chip 25 is responsible for processes associated with the Layer 1 (physical layer) in the OSI reference model. The MAC chip 26 is responsible for processes associated with the MAC layer. The MAC switch 24 performs a process (switching) for transferring a MAC frame inputted from each MAC chip 26, to a MAC chip 26 depending on its destination. The above MAC address table may be used for this switching.

<MAC Concatenation Process>

The MAC concatenation process executed in the MAC chip 26 illustrated in FIG. 4 will be described next. For the MAC concatenation process, the CPU 21 may issue instructions on a concatenation scheme to be used, a frame size to be concatenated, and the like, to the MAC chip 26.

Figure 10:
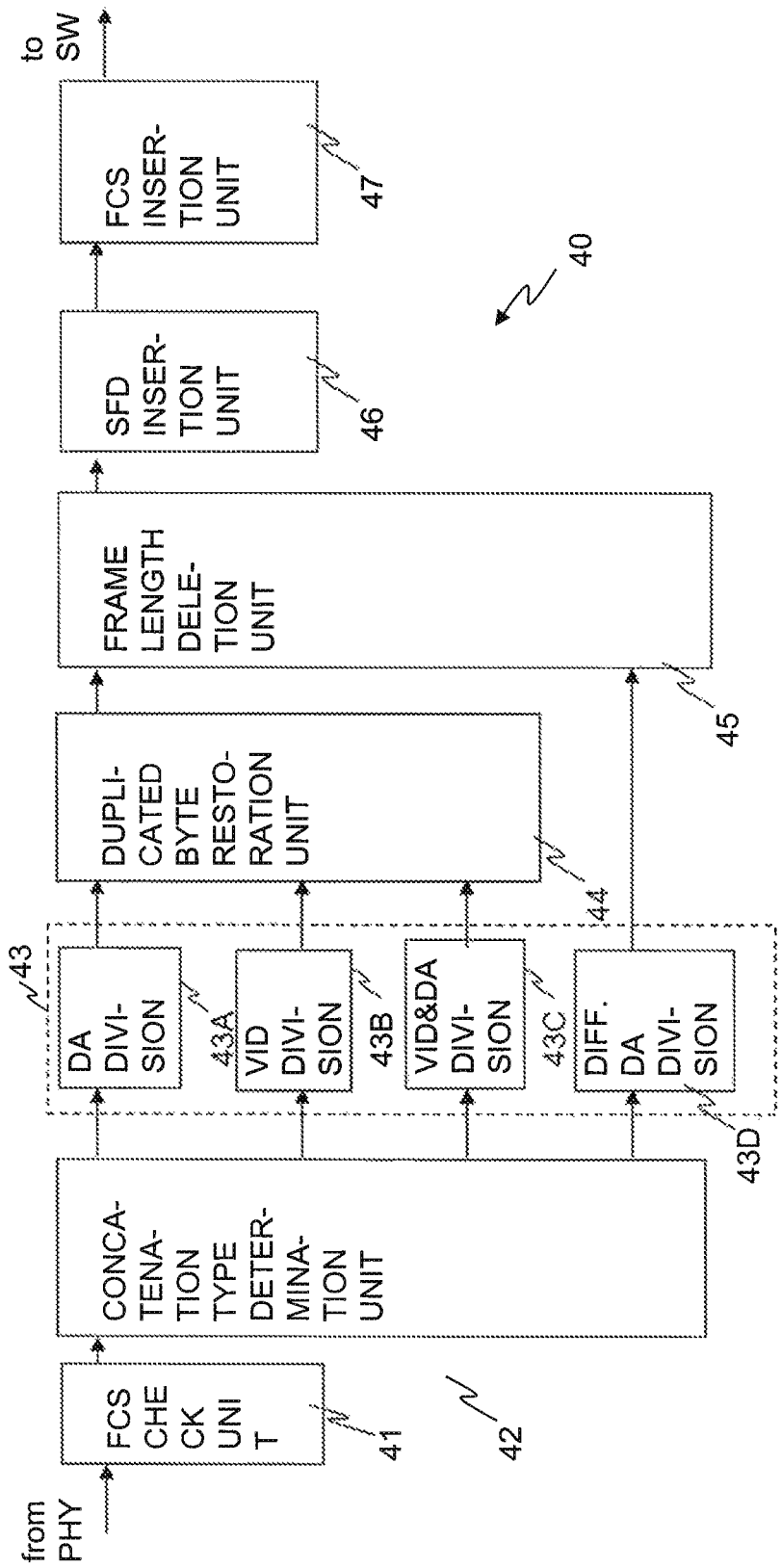
FIG. 10 illustrates a configuration example of an ingress-side MAC processing unit.

The MAC chip 26 includes a MAC processing unit 30 of the egress side (FIG. 5) and a MAC processing unit 40 of ingress side (FIG. 10). The egress-side MAC processing unit 30 performs processes associated with MAC frames flowing in a MAC frame transmission direction (MAC→PHY). In contrast, the ingress-side MAC processing unit 40 performs processes associated with MAC frames flowing in a MAC frame reception direction (PHY→MAC).

<<Egress-Side MAC Processing Unit>>

Figure 5:
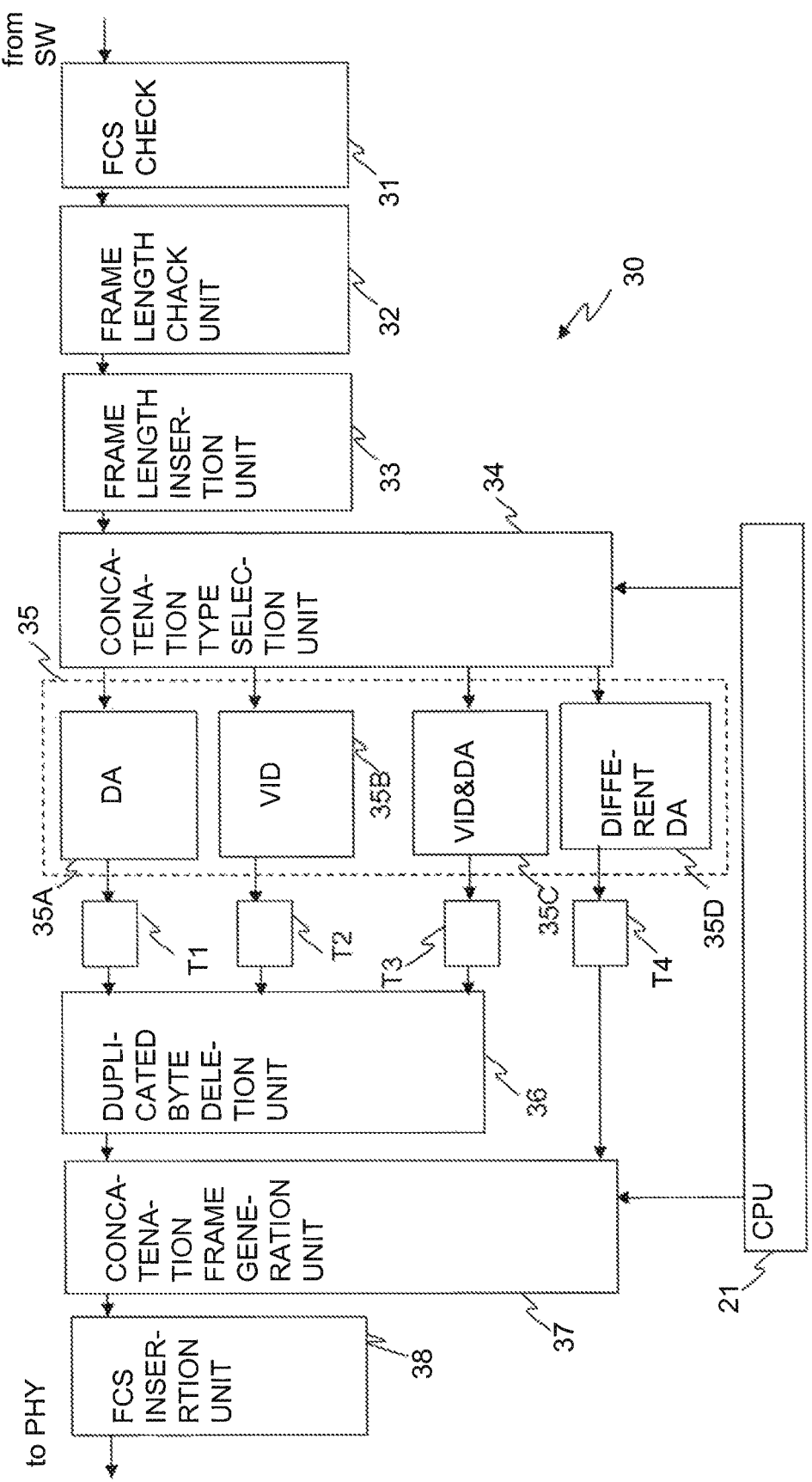
FIG. 5 illustrates a configuration example of an egress-side MAC processing unit.

FIG. 5 illustrates a configuration example of the egress-side MAC processing unit. The egress-side MAC processing unit 30 performs the MAC frame concatenation by concatenating plurality of MAC frames.

The egress-side MAC processing unit 30 includes an FCS check unit 31, a frame length check unit 32, a frame length insertion unit 33, a concatenation type selection unit 34 (hereinafter, the selection unit 34), a concatenation type insertion unit 35 (hereinafter, the type insertion unit 35), a duplicated byte deletion unit 36 (hereinafter, the deletion unit 36), a concatenation frame generation unit 37 (hereinafter, the generation unit 37), and an FCS insertion unit 38.

The type insertion unit 35 includes a DA concatenation type insertion unit 35A, a VID concatenation type insertion unit 35B, a VID and DA concatenation type insertion unit 35C, and a different DA concatenation type insertion unit 35D. Management tables T1 to T4 are also provided between the type insertion units 35A to 35D and the deletion unit 36. The management tables T1 to T4 are illustrative of a storage unit.

The MAC frame sent out from the MAC switch 24 is inputted into the FCS check unit 31. The FCS check unit 31 detects the MAC frame by detecting the preamble and the SFD of the MAC frame, and checks the FCS of the detected MAC frame.

The frame length check unit 32 checks (calculates) the frame length (the length of the DA, the SA, the Type/Length, the data portion and the FCS) of the MAC frame.

The frame length insertion unit 33 inserts the calculated frame length (referred to as "frame length bit string") into the MAC frame. The selection unit 34 selects the concatenation scheme (concatenation type) for the MAC frame based on the instruction (specifying the concatenation scheme) from the CPU 21, and sends the MAC frame to any of the type insertion units 35A to 35D, depending on the concatenation scheme.

Four types of concatenation schemes (concatenation types) including "DA concatenation," "V-LAN ID (VID) concatenation," "VID and DA concatenation" and "different DA concatenation" are illustrated herein (each type will be described later).

Each of the type insertion units 35A to 35D inserts data (referred to as "concatenation type bit string") indicating the selected concatenation scheme (concatenation type), into the MAC frame. Each of the type insertion units 35A to 35D includes the management table (buffer) that temporarily stores the MAC frame. The MAC frame to which a concatenation type byte is inserted is temporarily stored in a corresponding one of the management tables T1 to T4.

The deletion unit 36 reads out a plurality of MAC frames to be concatenated (being concatenation targets), from any of the management tables (buffers) T1 to T4, in response to a request from the generation unit 37. The deletion unit 36 deletes duplicated bytes (data, that is, the DA and/or a VID) among the plurality of read out MAC frames, and sends the plurality of MAC frames to the generation unit 37.

The generation unit 37 generates a concatenation frame (concatenated frame) in the frame size depending on the instruction from the CPU 21, based on the control by the CPU 21.

Here, for the read out of the MAC frames from the management table, for example, the generation unit 37 may monitor the total size (an amount of buffer storage) of the MAC frames stored in each of the management tables T1 to T4. When the amount of buffer storage reaches an amount depending on the frame size of the concatenated frame, the generation unit 37 may give the deletion unit 36 an instruction to read out the MAC frames from the corresponding management table (the concatenation type: other than the different DA). Otherwise, the generation unit may read out the MAC frames directly from the management table T4 (the concatenation type: the different DA). Otherwise, the deletion unit 36 or the generation unit 37 may periodically read out the MAC frames in the management tables T1 to T4, in a predetermined period.

The FCS insertion unit 38 performs the CRC calculation for the concatenated frame generated in the generation unit 37, inserts a result of the calculation as the FCS into the concatenated frame, and then sends out the concatenated frame toward the PHY chip 25.

Figure 6:
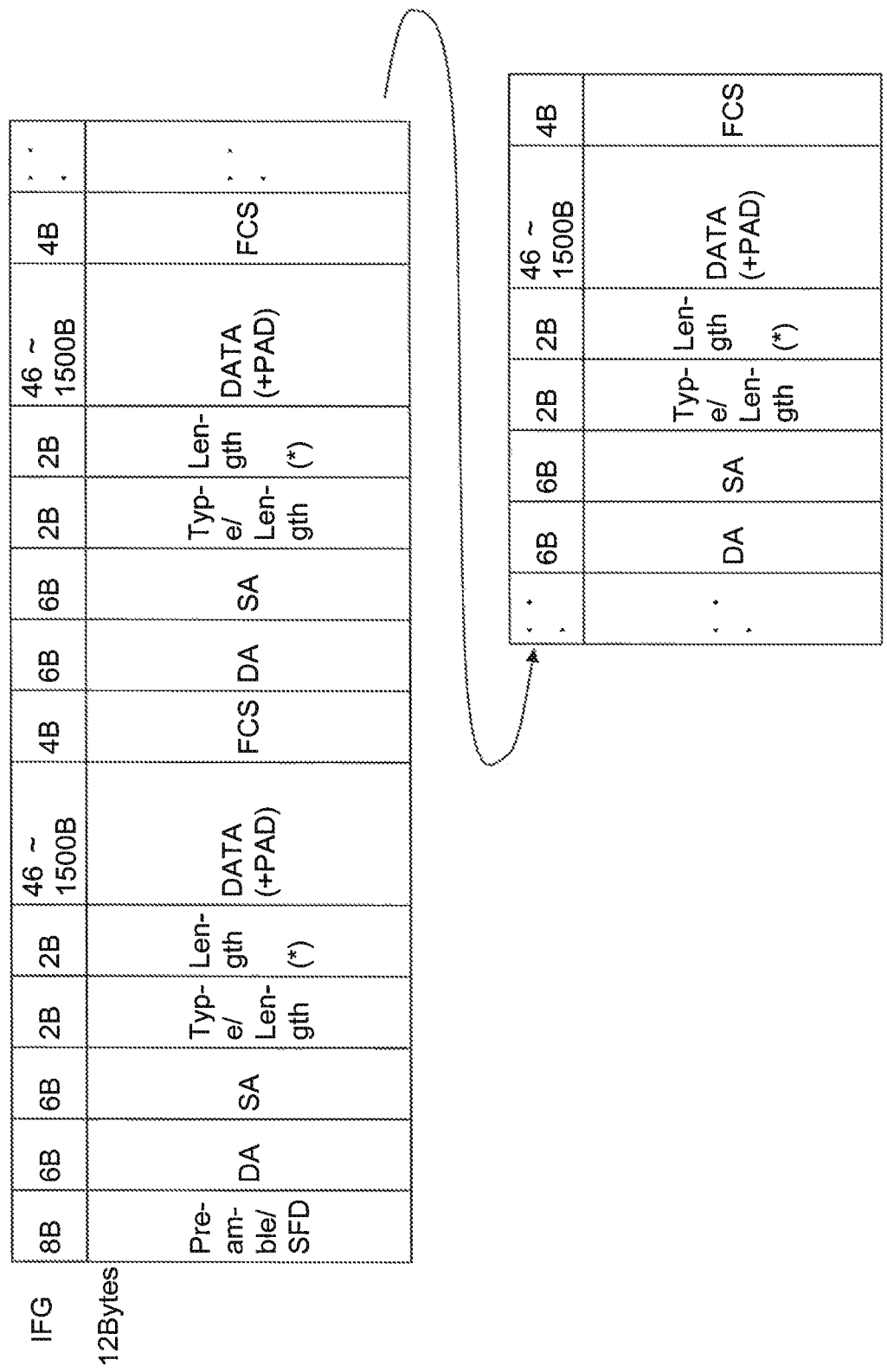
FIG. 6 illustrates a format of a concatenated frame generated by a "different DA concatenation" scheme (fourth process).

FIG. 6 illustrates a format of the concatenated frame. The concatenated frame format illustrated in FIG. 6 illustrates a format of the concatenated frame in the case of the concatenation type of "different DA." This concatenated frame specifically has a data structure as described below.

Firstly, in the plurality of MAC frames to be concatenated, the preambles and the SFDs associated with remaining MAC frames, except the preamble and the SFD of the first MAC frame, are omitted.

Secondly, a new field, "Length" field (2 bytes) is inserted following the Type/Length field of a portion corresponding to each of the MAC frames that have been concatenated (a field with an asterisk (*) is the "Length" field in FIG. 6). The frame length bit string and the concatenation type bit string described above are stored in the "Length" field.

FIG. 7 illustrates a data structure example of the "Length" field. In the example illustrated in FIG. 7, the bit string (referred to as "concatenation code") indicating the concatenation type (concatenation scheme) is represented in 2 bits, and stored in 2 bits (bits b0 and b1) from the beginning of the "Length" field. In contrast, the frame length bit string is represented in remaining 14 bits (bits b2 to b15). Accordingly, the frame length up to 16384 bytes may be represented.

The concatenation type bit string (the concatenation code: bits b0 and b1) represents the scheme of the concatenation (concatenation scheme). FIG. 8 is a correspondence table between the concatenation codes represented in bits b0 and b1, and the concatenation schemes corresponding to the concatenation codes.

As the concatenation schemes described in the embodiment, the following four types are prepared.

(1) The "different DA concatenation" scheme for concatenating MAC frames having different destination addresses (DAs).

(2) The "DA concatenation" scheme for concatenating MAC frames having the same DA.

(3) The "VID concatenation" scheme for concatenating MAC frames having the same VID.

(4) The "VID and DA concatenation" scheme for concatenating MAC frames having the same VID and DA.

Accordingly, the concatenation code "00" (the different DA concatenation scheme) is inserted into the MAC frame, in the different DA concatenation type insertion unit 35D, while the concatenation code "01" (the DA concatenation scheme) is inserted into the MAC frame, in the DA concatenation type insertion unit 35A. Moreover, the concatenation code "10" (the VID concatenation scheme) is inserted into the MAC frame, in the VID concatenation type insertion unit 35B, while the concatenation code "11" (the VID and DA concatenation scheme) is inserted into the MAC frame, in the VID and DA concatenation type insertion unit 35C.

In the concatenated frame illustrated in FIG. 6, a portion immediately after the Type/Length field of a MAC frame portion located at the beginning of the concatenated frame, to the data portion of a MAC frame portion located at the end, may be regarded as the data portion of the concatenated frame. For the value of the FCS field, however, a new value (calculated in the FCS insertion unit 38) is set, which is calculated in consideration of the entire concatenated frame.

The concatenated frame thus has the same format as that of the standard MAC frame. Accordingly, the same MAC address table as the MAC address table applied to the standard MAC frame may be used in management. This means that the concatenated frame may be relayed by a general-purpose L2 switch and used in an End-to-End manner.

The number of bytes of the "Length" field, the number of bits of the concatenation type bit string (code), and the number of bits of the frame length as described above are by way of illustration, and may be changed as appropriate, depending on the number of types of the concatenation schemes or a field length desired to be represented.

<<Operation Example of egress-Side MAC Processing Unit (MAC Frame Concatenation (Different DA Concatenation))>>

Figure 9:
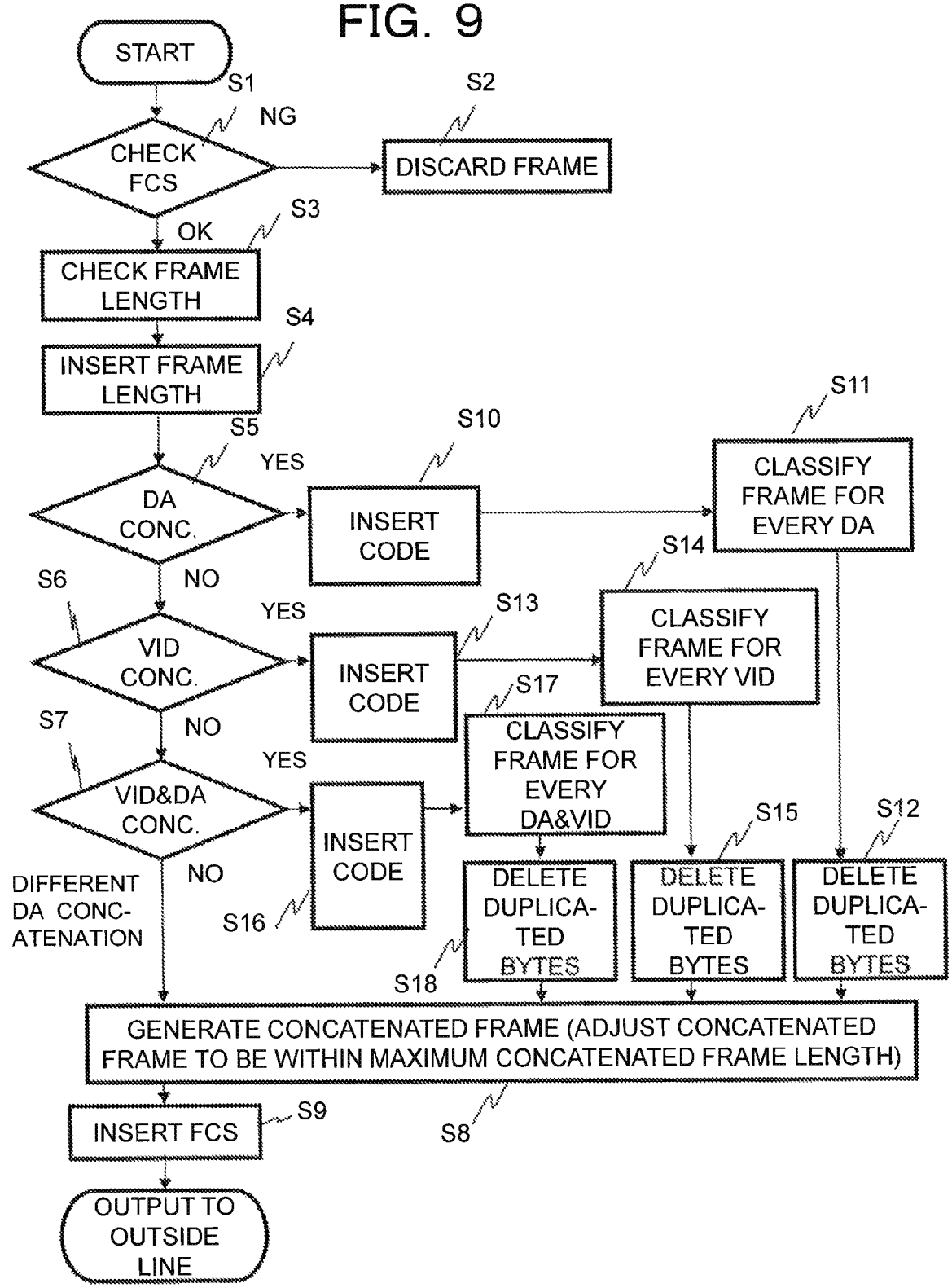
FIG. 9 illustrates a process flowchart of the egress-side MAC processing unit.

FIG. 9 is a flowchart illustrating an operation example of the egress-side MAC processing unit 30. A process illustrated in FIG. 9 is started with the input of the MAC frame into the MAC processing unit 30.

In step S1, the FCS check unit 31 detects the MAC frame, and executes the FCS check (CRC check). Then, when the FCS check results in an error, the frame is discarded (step S2). In contrast, when the FCS check results in "OK," the MAC frame is passed to the frame length check unit 32.

The frame length check unit 32 checks (measures) the frame length of the MAC frame (step S3), and passes the frame length bit string indicating the measured frame length, and the MAC frame, to the frame length insertion unit 33.

The frame length insertion unit 33 inserts the frame length bit string into a predetermined position (between the Type/Length field and the data portion) in the MAC frame (step S4), and passes the MAC frame to the selection unit 34.

The selection unit 34 passes the MAC frame to any of the concatenation type insertion units 35A to 35D, depending on the instruction from the CPU 21. In other words, the selection unit 34 determines whether or not the concatenation type in the instruction is "DA concatenation" (step S5).

Then, when the concatenation type is "DA concatenation," the selection unit 34 advances the process to step S10. In contrast, when the concatenation type is not "DA concatenation," the selection unit 34 advances the process to step S6.

When the process advances to step S6, the selection unit 34 determines whether or not the concatenation type is "VID concatenation." Then, when the concatenation type is "VID concatenation," the selection unit 34 advances the process to step S13. In contrast, when the concatenation type is not "VID concatenation," the selection unit 34 advances the process to step S7.

When the process advances to step S7, the selection unit 34 determines whether or not the concatenation type is "VID and DA concatenation." Then, when the concatenation type is "VID and DA concatenation," the selection unit 34 advances the process to step S16. In contrast, when the concatenation type is not "VID and DA concatenation," the selection unit 34 advances the process to step S8.

When the process advances from step S7 to step S8, the concatenated frame is generated according to the "different DA concatenation" scheme. In other words, in step S8, the MAC frame is passed from the selection unit 34 to the different DA concatenation type insertion unit 35D. The different DA concatenation type insertion unit 35D inserts the code "00" indicating the different DA concatenation scheme (FIG. 8), into a predetermined position (concatenation code insertion position) in the MAC frame, and stores the MAC frame into the management table (buffer) T4.

Then, at appropriate timing specified by the CPU 21, the plurality of MAC frames to be concatenated, which are stored in the management table T4, are read out and passed to the generation unit 37. The generation unit 37 generates the concatenated frame (FIG. 6) according to the above described different DA concatenation scheme, from the received MAC frames, and passes the concatenated frame to the FCS insertion unit 38. Then, the process advances to step S9.

In step S9, the FCS insertion unit 38 performs the CRC calculation for the concatenated frame, and stores the result of the calculation into the FCS field. Then, the concatenated frame is outputted to an outside line, and sent to the corresponding PHY chip 25 (FIG. 4). The process in and after step S10 will be described later.

In the above operation example, an example has been illustrated in which the generation unit 37 attaches the preamble and the SFD, as information for establishing synchronization, to the beginning of the concatenated frame. In contrast, an attachment unit that attaches the preamble and the SFD may be provided following the generation unit 37. Moreover, the attachment of the SFD and the attachment of the preamble to the concatenated frame may be performed by different subjects (components).

<<Ingress-Side MAC Processing Unit>>

The ingress-side MAC processing unit 40 in the MAC chip (MAC device) 26 will be described next. FIG. 10 illustrates a configuration example of the ingress-side MAC processing unit 40. The MAC processing unit 40 dissolves the MAC frame concatenation to restore each MAC frame before being concatenated.

In FIG. 10, the MAC processing unit 40 includes an FCS check unit 41, a concatenation type determination unit 42, a concatenated frame division unit 43, a duplicated byte restoration unit 44 (hereinafter, the restoration unit), a frame length deletion unit 45 (hereinafter, the deletion unit 45), an SFD insertion unit 46, and an FCS insertion unit 47.

The division unit 43 includes a DA division unit 43A corresponding to the "DA concatenation" scheme, a VID division unit 43B corresponding to the "VID concatenation" scheme, a DA and VID division unit 43C corresponding to the "VID and DA concatenation" scheme, and a different DA division unit 43D corresponding to the "different DA concatenation" scheme.

The FCS check unit 41 performs the FCS check (CRC check) for the concatenated frame received from the PHY chip 25 (FIG. 4).

The concatenation type determination unit 42 determines the concatenation type of the concatenated frame. The concatenation type determination unit 42, for example, has an offset position of the first "Length" field from the beginning of the concatenated frame, and detects the concatenation code (bits b0 and b1) indicating the concatenation type, based on the offset position.

Then, when the concatenation code is "00 (the different DA concatenation)," the concatenation type determination unit 42 passes the concatenated frame to the different DA division unit 43D. In contrast, when the concatenation code is "01 (the DA concatenation)," the concatenation type determination unit 42 passes the concatenated frame to the DA division unit 43A. In contrast, when the concatenation code is "10 (the VID concatenation)," the concatenation type determination unit 42 passes the concatenated frame to the VID division unit 43B. In contrast, when the concatenation code is "11 (the VID and DA concatenation)," the concatenation type determination unit 42 passes the concatenated frame to the VID and DA division unit 43C.

In the division unit 43, a division process for the concatenated frame is performed depending on the concatenation type. When the concatenation type is "different DA," for example, the different DA division unit 43D divides the concatenated frame into plurality of unit blocks each including a portion from the DA field to the field (FCS field) immediately preceding the next DA field, as a unit.

The start position of the DA field of the MAC frame located at the beginning of the concatenated frame is the same as the start position of the DA field of the standard MAC frame, and thus may be obtained from the offset position of the DA field of the standard MAC frame.

The start position (the offset position on the concatenated frame) of the DA field of each of the second and subsequent MAC frame portions from the beginning is calculated from the frame length represented in the frame length bit string in the "Length" field included in a portion corresponding to the immediately preceding MAC frame.

The frame length in the "Length" field included in each MAC frame portion in the concatenated frame indicates the frame length (the length from the DA to the FCS) of the MAC frame portion.

Accordingly, for example, when the start position of the DA field of the second MAC frame portion is obtained, the start position of the DA field of the first MAC frame portion is set as a starting point, and a portion corresponding to the frame length of the first MAC frame from the starting point is included in the first MAC frame portion. The FCS field included in the first MAC frame portion is followed by the start position (the offset position) of the DA field of the next (second) MAC frame.

Accordingly, the offset position of the DA field in the third MAC frame portion may be obtained from the offset position of the second DA field, and the frame length stored in the "Length" field of the second MAC frame portion (the start position is a position at 16 bytes away from the start position of the DA). The DA field of each MAC frame included in the concatenated frame may thus be detected, and the concatenated frame may be divided at the start position of each DA field.

The DA division unit 43A, the VID division unit 43B and the VID and DA division unit 43C divide the concatenated frame into the plurality of unit blocks according to the concatenation type (to be described in detail later).

The duplicated byte restoration unit 44 restores the field (the DA field and/or the VID field), which has been omitted in the concatenation process, in each of the plurality of unit blocks received from the division units 43A to 43C, according to the concatenation type.

The frame length deletion unit 45 deletes the "Length" field from each unit block received from the duplicated byte restoration unit 44 or the different DA division unit 43D.

The SFD insertion unit 46 inserts the SFD into each unit block received from the frame length deletion unit 45. The FCS insertion unit 47 calculates the CRC 32 for each unit block received from the SFD insertion unit 46, and inserts the result of the calculation into each FCS field. Original MAC frames are thus restored.

Then, each unit block is sent out as each MAC frame, following the preamble (7 bytes) at intervals of the IFG. Each sent-out MAC frame is sent to the MAC switch 24.

<<Operation Example of Ingress-Side MAC Processing Unit (Restoration of Original Frames (Different DA Concatenation))>>

Figure 11:
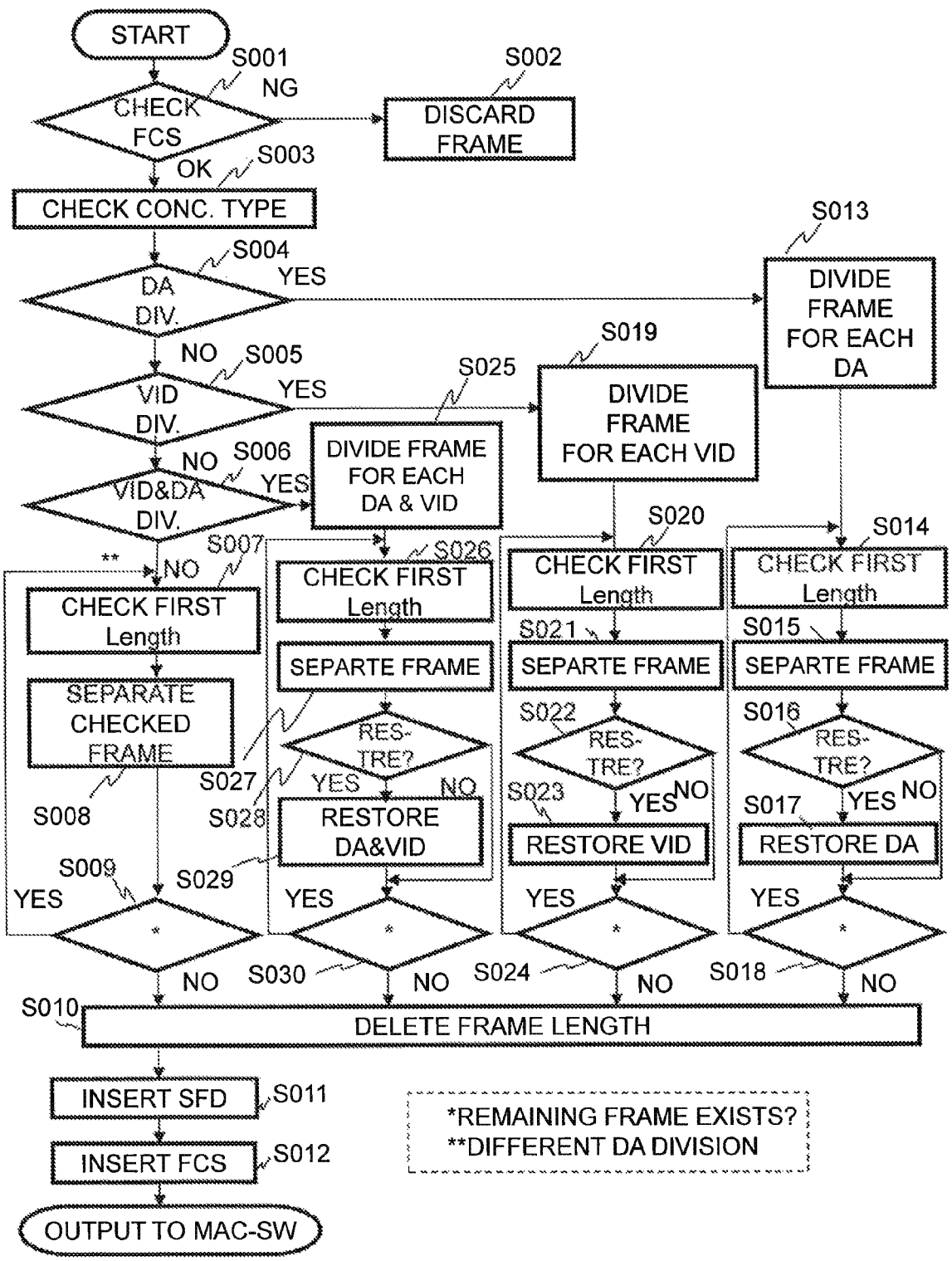
FIG. 11 illustrates a process flowchart on the ingress-side.

FIG. 11 is a flowchart illustrating an operation example of the ingress-side MAC processing unit 40. A process illustrated in FIG. 11 is started with the input of the concatenated frame into the MAC processing unit 40.

In step S001, the FCS check unit 41 detects the concatenated frame, and executes the FCS check (CRC check). Then, when the FCS check results in an error, the frame is discarded (step S002). In contrast, when the FCS check results in "OK," the concatenated frame is passed to the concatenation type determination unit 42.

The concatenation type determination unit 42 checks the concatenation type (step S003). In other words, the concatenation type determination unit 42, for example, detects the code indicating the concatenation type from the "Length" field, based on the offset position of the first "Length" field in the concatenated frame, which has been previously retained, and recognizes the concatenation type indicated by the code.

Then, the concatenation type determination unit 42 passes the concatenated frame to any of the division units 43A to 43D, corresponding to the recognized concatenation type. In other words, the concatenation type determination unit 42 determines whether or not the concatenation type is "DA concatenation" (step S004).

Then, when the concatenation type is "DA concatenation," the concatenation type determination unit 42 advances the process to step S013. In contrast, when the concatenation type is not "DA concatenation," the concatenation type determination unit 42 advances the process to step S005.

When the process advances to step S005, the concatenation type determination unit 42 determines whether or not the concatenation type is "VID concatenation." Then, when the concatenation type is "VID concatenation," the concatenation type determination unit 42 advances the process to step S019. In contrast, when the concatenation type is not "VID concatenation," the concatenation type determination unit 42 advances the process to step S006.

When the process advances to step S006, the concatenation type determination unit 42 determines whether or not the concatenation type is "VID and DA concatenation." Then, when the concatenation type is "VID and DA concatenation," the concatenation type determination unit 42 advances the process to step S025. In contrast, when the concatenation type is not "VID and DA concatenation," the concatenation type determination unit 42 advances the process to step S007.

When the process advances from step S006 to step S007, a division operation for the concatenated frame is performed according to the "different DA concatenation" scheme. In other words, the concatenated frame is passed from the concatenation type determination unit 42 to the different DA division unit 43D. In step S007, the different DA division unit 43D checks the field length in the "Length" field of the first MAC frame portion in the concatenated frame.

Then, the different DA division unit 43D separates (divides) a portion from the first MAC frame portion to the FCS field, as the unit block, according to the field length (step S008).

Subsequently, the different DA division unit 43D determines whether or not the remaining portion of the concatenated frame includes the next MAC frame portion (step S009). Then, when the next MAC frame portion remains, the process returns to step S007, where the first "Length" field of the remaining portion is checked to determine a division position, and the unit block is separated (step S008). Such a loop process is performed until the next MAC frame portion no longer exists (NO in the determination in step S009).

Then, the plurality of unit blocks created by dividing the concatenated frame are passed to the frame length deletion unit 45. The frame length deletion unit 45 deletes the "Length" field included in each unit block (step S010).

The frame length deletion unit 45 passes each unit block to the SFD insertion unit 46. The SFD insertion unit 46 inserts the SFD into each unit block (step S011).

Then, the SFD insertion unit 46 passes each unit block to the FCS insertion unit 47. The FCS insertion unit 47 calculates the FCS (CRC 32) for each unit block, and stores the result of the calculation into the FCS field (step S012).

Then, the FCS insertion unit 47 sends out each MAC frame following the preamble, toward the MAC switch 24, at appropriate timing (timing according to the IFG). The process in and after step S013 will be described later.

In the data center in FIG. 1, the MAC frame concatenation as described above is applicable to uplink communication (the L2 switches 13 and 14→the L2 switch 15) and downlink communication (the L2 switch 15→the L2 switches 13 and 14), each of which provides connection between each of the L2 switches 13 and 14, and the upper L2 switch 15.

In the above described concatenated frame generation (MAC frame concatenation) process (egress-side (transmitter) process), the concatenated frame is generated while frame length information on each MAC frame portion included in the concatenated frame is inserted, the concatenation code for each concatenation scheme is inserted, the duplicated bytes that may be omitted are deleted, and the frame size is constrained to be within the maximum frame length.

In contrast, in a process flow on the ingress-side (receiver), in order to restore the MAC-concatenated frame, the received concatenated frame is divided into each frame (unit block) before being concatenated, based on the concatenation type of the frame, and the inserted frame length byte is deleted to thereby realize the restoration of the original frame.

Accordingly, transmission and reception of the MAC concatenation frame (concatenated frame) may be enabled by adding a function of realizing the above processes, to a communication apparatus (for example, the L2 switch) that transmits and receives the standard MAC frame.

According to the above operation examples, while the SFD is not attached to each MAC frame as in the conventional case, only one SFD is attached to the concatenated frame in which the plurality of MAC frames are concatenated. Each of the second and subsequent MAC frames included in the concatenated frame is thereby put into a state where the IFG, the preamble and the SFD (20 bytes) are omitted therefrom. In other words, insertion of the SFD and the preamble of 8 bytes, which are the information for establishing synchronization, into each MAC frame may be avoided.

The "Length" field of 2 bytes, however, is added to each MAC frame. Since the "Length" field of 2 bytes, of course, is at least smaller than the SFD of 1 byte and the preamble of 7 bytes, the number of MAC frames transmittable per unit time may be increased in comparison with the standard MAC frame format. Accordingly, the MAC frame transmission efficiency may be increased. The operating rates of the servers 1 and the storages 2 in the data center 10 may thereby be increased.

<MAC Frame Concatenation Based on DA Concatenation Scheme>

The MAC frame concatenation based on the "DA concatenation" scheme will be described next. In the "DA concatenation" scheme, the MAC frames having the same DA are collected to execute the MAC frame concatenation.

Differences from the above "different DA concatenation" scheme will be mainly described. In the egress-side MAC processing unit 30 illustrated in FIG. 5, the concatenation type selection unit 34 sends the MAC frame received from the frame length insertion unit 33, to the DA concatenation type insertion unit 35A, according to an instruction to execute the "DA concatenation" scheme, from the CPU 21.

The DA concatenation type insertion unit 35A inserts the concatenation code "01" indicating "DA concatenation" into the predetermined position in the MAC frame, and stores the MAC frame into the management table T1. Then, as the management table (buffer) T1, one or more management tables (buffers) T1 are prepared for each DA, or a different temporary storage area is prepared for each DA.

The deletion unit 36 reads out the plurality of MAC frames (having the same DA) depending on the concatenated frame size (not exceeding the maximum size of the concatenated frame) from one management table T1, based on the instruction from the generation unit 37. Subsequently, the deletion unit 36 deletes the DA field included in each MAC frame to be located at the second or subsequent position, in the plurality of read-out MAC frames, and leaves the DA of the MAC frame to be located at the beginning of the concatenated frame.

Figure 12:
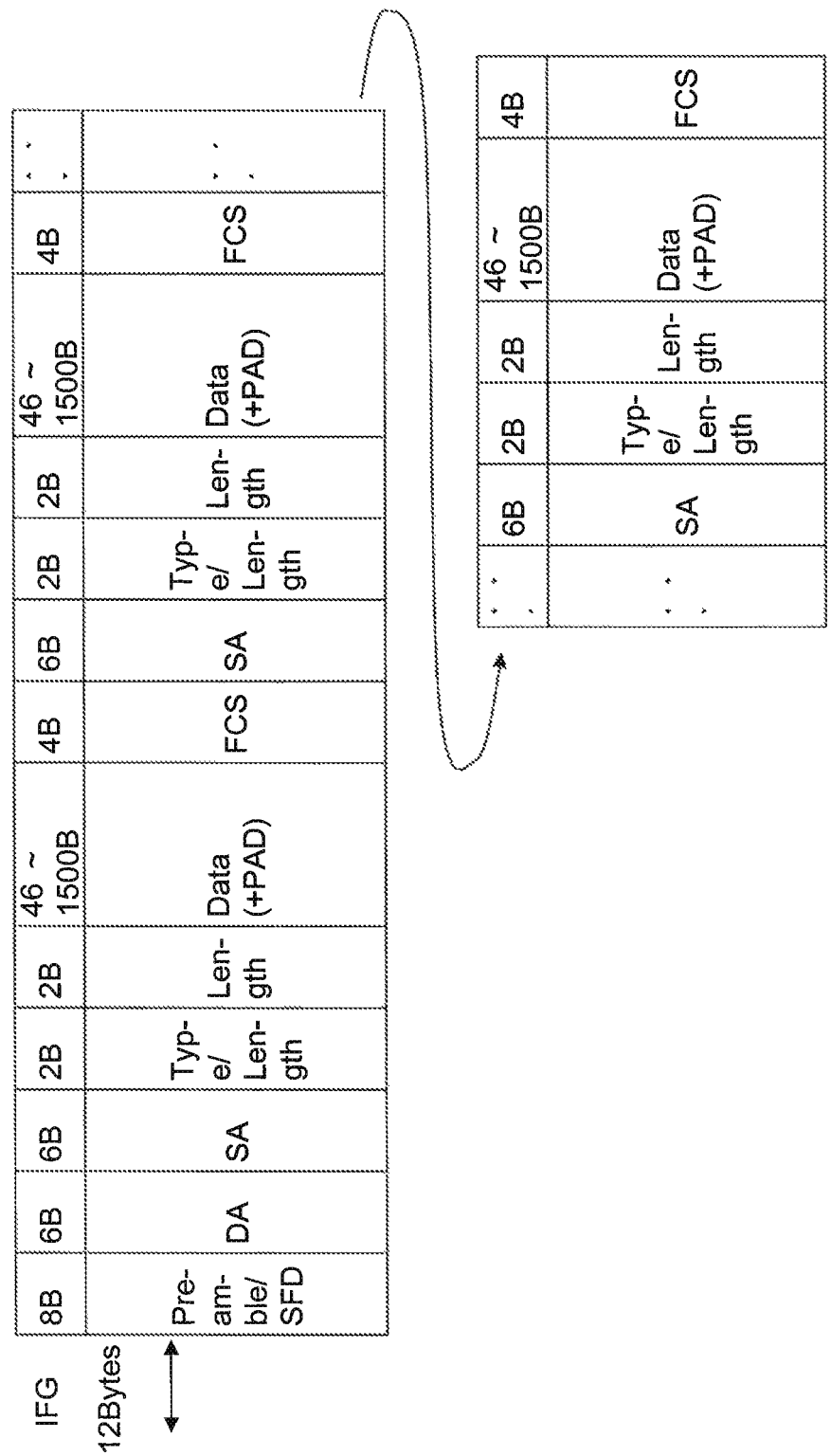
FIG. 12 illustrates a format of a concatenated frame generated by a "DA concatenation" scheme (first process).

The generation unit 37 generates the concatenated frame according to the "DA concatenation" scheme. FIG. 12 illustrates a format of the concatenated frame generated by the "DA concatenation" scheme.

A difference from the format in the "different DA concatenation" scheme is that the DA fields of the MAC frame portions located at the second and subsequent positions have been deleted. Accordingly, the "DA concatenation" scheme may allow for the improvement in the transmission efficiency depending on the sizes of the DA fields to be deleted, in comparison with the "different DA concatenation" scheme.

An operation example of the egress-side MAC processing unit 30 in the "DA concatenation" scheme will be described below using FIG. 9. In step S5 of FIG. 9, when the concatenation type is determined to be "DA concatenation," the concatenation code "01" is inserted into the MAC frame by the DA concatenation type insertion unit 35A in step S10.

Then, the MAC frame is classified into each DA (step S11), and temporarily stored in the management table (buffer) T1 corresponding to the DA. Then, when receiving the readout instruction from the generation unit 37, the deletion unit 36 reads out the MAC frames (having the same DA) of the number depending on the concatenated frame size, from the management table T1. Subsequently, the deletion unit 36 deletes the DA field from each MAC frame to be placed at the second or subsequent position in concatenated frame (step S12). Then, the DA field of the MAC frame to be placed at the beginning of the concatenated frame is not deleted. The deletion unit 36 gives the plurality of MAC frames to the generation unit 37.

The generation unit 37 generates the concatenated frame having the format illustrated in FIG. 12, according to the "DA concatenation" scheme (step S8). Subsequent process in and after step S9 (the insertion of the FCS) is similar to the "different DA concatenation" scheme.

The ingress-side MAC processing unit 40 in the "DA concatenation" scheme will be described next. In the ingress-side MAC processing unit 40 illustrated in FIG. 10, when the concatenation type determination unit 42 determines that the concatenation type is "DA concatenation," the concatenation type determination unit 42 inputs the concatenated frame into the DA division unit 43A.

A division process performed by the DA division unit 43A is different from the process performed by the different DA division unit 43D in the "different DA concatenation" scheme, in the following points. In the "DA concatenation" scheme, the DA field is not included in each of the second and subsequent MAC frame portions in the concatenated frame.

Hence, a value increased by the deleted DA field (6 bytes) is stored as the frame length stored in the "Length" field of each of the second and subsequent MAC frame portions.

Accordingly, in order to obtain the beginning position, that is, the start position of the SA field, of each of the third and subsequent MAC frame portions, the DA division unit 43A regards a value obtained by subtracting 6 bytes from the field length in the "Length" field of the immediately preceding MAC frame portion, as the frame length of the immediately preceding MAC frame portion, and obtains the start position of the SA field of the next MAC frame portion.

Of course, the above process is not required, for example, when a configuration is employed in which 6 bytes are subtracted from the field length in the "Length" field in response to the deletion of the DA field by the deletion unit 36 in the MAC processing unit 30. Such a process for changing the field length, for example, may be executed in the deletion unit 36 or the generation unit 37.

An operation example of the ingress-side MAC processing unit 40 in the "DA concatenation" scheme will be described below using FIG. 11. In step S004 illustrated in FIG. 11, when the concatenation type is determined to be "DA concatenation," the concatenated frame is sent from the concatenation type determination unit 42 to the DA division unit 43A (step S013).

The DA division unit 43A detects the frame length in the "Length" field of the first MAC frame portion in the concatenated frame (S014). Subsequently, the DA division unit 43A identifies the end position of the FCS field in the first MAC frame, based on the frame length, and separates the MAC frame portion (unit block) at the end position (step S015).

The DA division unit 43A passes the unit block to the restoration unit 44. The restoration unit 44 determines whether or not to restore the DA, based on whether or not the passed unit block is the first MAC frame portion (step S016). Then, when the unit block is the first MAC frame portion, the process advances to step S018, where it is determined whether or not the next MAC frame portion (the remaining portion of the concatenated frame) exists.

This determination is performed in the DA division unit 43A. Accordingly, the process in steps S014, S015 and S018 is performed in the DA division unit 43A, while the process in steps S016 and S017 is performed in the restoration unit 44. The processes in the both units may thus not be performed in the order of the flow, and for example, the process in step S016 and the process in step S018 may be executed in parallel.

When the next MAC frame portion exists, the process returns to step S014, where the frame length in the "Length"

field located closest to the beginning of the remaining portion of the concatenated frame is detected, and based on this frame length, the separation (a position of the separation) is determined, and the unit block separation process is performed (step S015).

As described above, since the DA fields have been deleted from the second and subsequent MAC frame portions, the value obtained by subtracting the DA field length from the frame length is used to determine the start position of the SA field of the next MAC frame portion (the position of the separation of the next unit block).

Since the DA fields have been deleted from the second and subsequent MAC frame portions (unit blocks), the restoration unit 44 replicates the value of the DA field of the first MAC frame portion (unit block) (at the first position), and attaches the replicated value to each of the second and subsequent unit blocks (step S017). The DA fields are thus restored in the unit blocks.

According to a loop process in steps S014 to S018, the plurality of unit blocks are generated in which the DA fields have been restored if necessary. The frame length deletion unit 45 deletes the "Length" field from each of the plurality of unit blocks (step S010). Then, a process similar to the "different DA concatenation" scheme is performed (steps S011 and S012).

The concatenated frame that may be handled as the standard MAC frame may thus also be generated in the "DA concatenation" scheme. Moreover, the "DA concatenation" scheme may increase the number of MAC frames that may be included in the concatenated frame, depending on the sizes of the DA fields to be deleted, in comparison with the "different DA concatenation" scheme, and thus may increase the MAC frame transmission efficiency.

<MAC Frame Concatenation Based on VID Concatenation Scheme>

The MAC frame concatenation based on the "VID concatenation" scheme will be described next. In the "VID concatenation" scheme, the MAC frames having the same VID (VLAN ID) are collected to execute the MAC frame concatenation.

Differences from the above "different DA concatenation" scheme will be mainly described. In the egress-side MAC processing unit 30 illustrated in FIG. 5, the processes performed by the FCS check unit 31, the frame length check unit 32 and the frame length insertion unit 33 are similar to the "different DA concatenation" scheme. In contrast, the concatenation type selection unit 34 sends the MAC frame received from the frame length insertion unit 33, to the VID concatenation type insertion unit 35B, according to an instruction to execute the "VID concatenation" scheme, from the CPU 21.

The VID concatenation type insertion unit 35B inserts the concatenation code "10" indicating "VID concatenation" into the predetermined position in the MAC frame, and stores the MAC frame into the management table T2. Then, as the management table (buffer) T2, one or more management tables (buffers) T2 are prepared for each VID, or a different temporary storage area is prepared for each VID.

The deletion unit 36 reads out the plurality of MAC frames (having the same VID) depending on the concatenated frame size (not exceeding the maximum size of the concatenated frame) from one management table (buffer) T2, based on the instruction from the generation unit 37. Subsequently, the deletion unit 36 deletes a VLAN tag field included in each MAC frame to be located at the second or subsequent position, in the plurality of read-out MAC frames, and leaves the VLAN tag field of the MAC frame to be located at the beginning (at the first position) of the concatenated frame.

Figure 13:
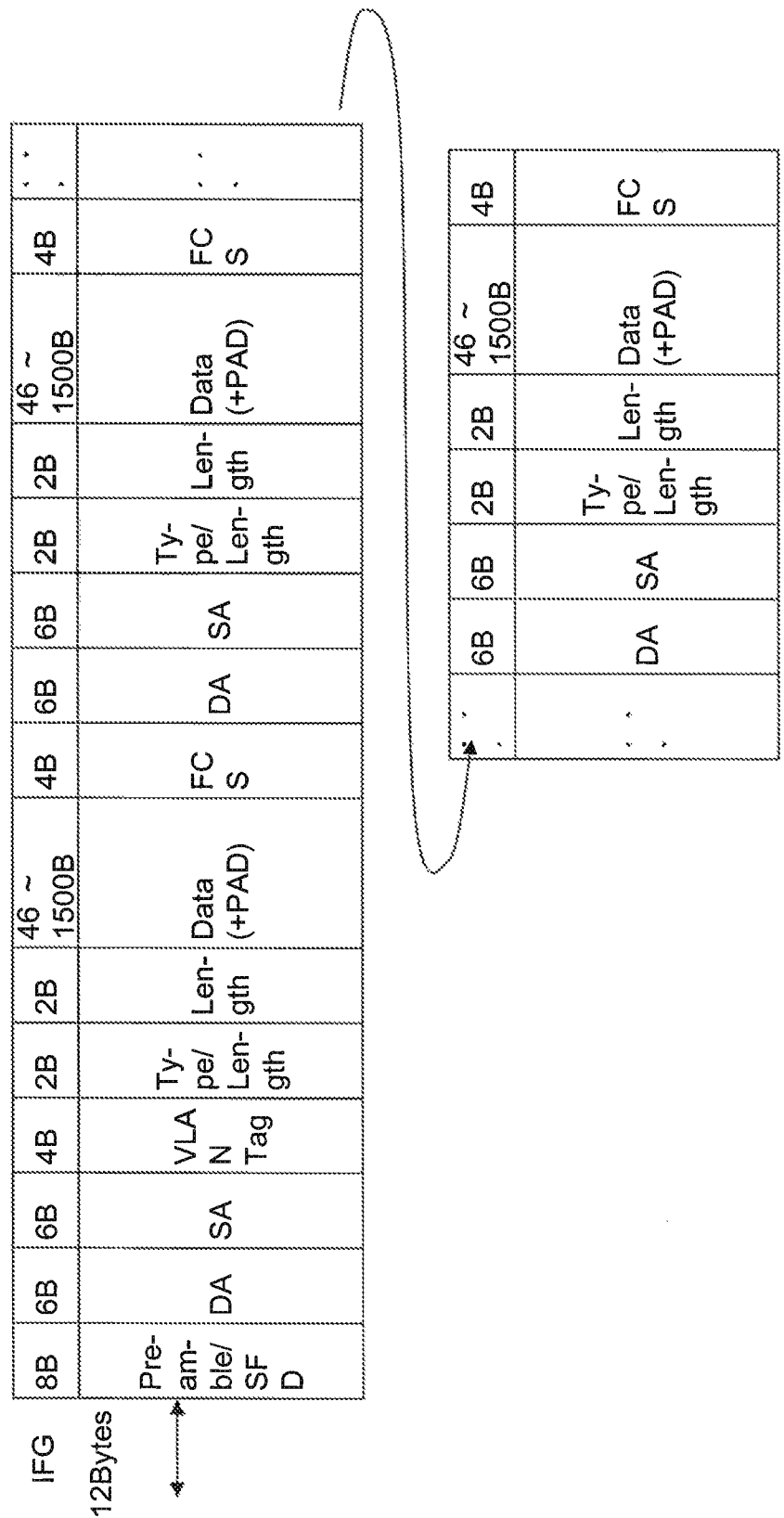
FIG. 13 illustrates a format of a concatenated frame generated by a "VID concatenation" scheme (second process).

The generation unit 37 generates the concatenated frame according to the "VID concatenation" scheme. FIG. 13 illustrates a format of the concatenated frame generated by the "VID concatenation" scheme.

In the MAC frame into which the VID is stored, the VLAN tag field (4 bytes) is provided as a field for storing the VID, between the SA field and the Type/Length field.

A difference between the concatenated frame format illustrated in FIG. 13 and the format in the "different DA concatenation" scheme (FIG. 6) is that the VLAN tag field of each of the MAC frame portions located at the second and subsequent positions has been deleted. Accordingly, the "VID concatenation" scheme may allow for the improvement in the transmission efficiency depending on the sizes of the VLAN tag fields to be deleted, in comparison with the "different DA concatenation" scheme.

An operation example of the egress-side MAC processing unit 30 in the "VID concatenation" scheme will be described below using FIG. 9. In step S6 of FIG. 9, when the concatenation type is determined to be "VID concatenation," the concatenation code "10" is inserted into the MAC frame by the VID concatenation type insertion unit 35B in step S13.

Then, the MAC frame is classified into each VID (step S14), and temporarily stored in the management table (buffer) T2 corresponding to the VID. Then, when receiving the readout instruction from the generation unit 37, the deletion unit 36 reads out the MAC frames (having the same VID) of the number depending on the concatenated frame size, from the management table (buffer) T2, and deletes the VLAN tag field from each MAC frame to be placed at the second or subsequent position in concatenated frame (step S15). The VLAN tag field of the MAC frame to be placed at the beginning (at the first position) in the concatenated frame, however, is not deleted. The plurality of MAC frames are given to the generation unit 37.

The generation unit 37 generates the concatenated frame having the format illustrated in FIG. 13, according to the "VID concatenation" scheme (step S8). The subsequent process in and after step S9 (the insertion of the FCS) is similar to the "different DA concatenation" scheme.

The ingress-side MAC processing unit 40 in the "VID concatenation" scheme will be described next. In the ingress-side MAC processing unit 40 illustrated in FIG. 10, when the concatenation type determination unit 42 determines that the concatenation type is "VID concatenation," the concatenation type determination unit 42 inputs the concatenated frame into the VID division unit 43B.

A process performed by the VID division unit 43B is different from the process performed by the different DA division unit 43D in the "different DA concatenation" scheme, in the following points. In the "VID concatenation" scheme, the VLAN tag field is not included in each of the second and subsequent MAC frame portions in the concatenated frame. Hence, a value increased by the deleted VLAN tag field (4 bytes) is stored as the frame length stored in the "Length" field of each of the second and subsequent MAC frame portions.

Accordingly, in order to obtain the beginning position, that is, the start position of the DA field, of each of the third and subsequent MAC frame portions, the VID division unit 43B regards a value obtained by subtracting 4 bytes from the field length in the "Length" field of the immediately preceding MAC frame portion, as the frame length of the immediately preceding MAC frame portion, and obtains the start position of the DA field of the next MAC frame portion.

Of course, the above process is not required, for example, when a configuration is employed in which 4 bytes are subtracted from the field length in the "Length" field in response to the deletion of the VLAN tag field by the deletion unit 36 in the MAC processing unit 30. Such a process for changing the field length may be executed in the deletion unit 36 or the generation unit 37.

An operation example of the ingress-side MAC processing unit 40 in the "VID concatenation" scheme will be described below using FIG. 11. In step S005 illustrated in FIG. 11, when the concatenation type is determined to be "VID concatenation," the concatenated frame is sent from the concatenation type determination unit 42 to the VID division unit 43B (step S019).

The VID division unit 43B detects the frame length in the "Length" field of the first MAC frame portion (at the first position) in the concatenated frame (step S020). Subsequently, the VID division unit 43B identifies the end position of the FCS field in the first MAC frame in the concatenated frame, and separates the MAC frame portion (unit block) at the end position (step S021).

The VID division unit 43B passes the unit block to the restoration unit 44. The restoration unit 44 determines whether or not to restore the VID, based on whether or not the passed unit block is the first MAC frame portion (step S022). Then, when the unit block is the first MAC frame portion, the process advances to step S024, where it is determined whether or not the next MAC frame portion (the remaining portion of the concatenated frame) exists.

The determination in step S024 is performed in the VID division unit 43B. Accordingly, the process in steps S020, S021 and S024 is performed in the VID division unit 43B, while the process in steps S022 and S023 is performed in the restoration unit 44. The processes in the both units may thus not be performed in the order of the flow, and for example, the process in step S022 and the process in step S024 may be executed in parallel.

When the next MAC frame portion (the remaining portion of the concatenated frame) exists, the process returns to step S020, where the frame length in the "Length" field located closest to the beginning of the remaining portion of the concatenated frame is detected, and based on this frame length, the separation (the position of the separation) is determined, and the unit block separation process is performed (step S021).

As described above, since the VLAN tag fields have been deleted from the second and subsequent MAC frame portions, the value obtained by subtracting the VLAN tag field length (4 bytes) from the frame length is used to determine the start position of the DA field of the next MAC frame portion (the position of the separation of the next unit block).

Since the VLAN tag fields have been deleted from the second and subsequent MAC frame portions (unit blocks), the restoration unit 44 replicates the value of the VLAN tag field, that is, the VID, of the first MAC frame portion (unit block) (at the first position), and attaches the replicated value to each of the second and subsequent unit blocks (step S023). The VLAN tag fields are thus restored in the unit blocks.

According to a loop process in steps S020 to S024, the plurality of unit blocks are generated in which the VLAN tag fields have been restored if necessary. The frame length deletion unit 45 deletes the "Length" field from each of the plurality of unit blocks (step S010). Then, the process similar to the "different DA concatenation" scheme is performed (steps S011 and S012).

The concatenated frame that may be handled as the standard MAC frame may thus also be generated in the "VID concatenation" scheme. Moreover, the "VID concatenation" scheme may increase the number of MAC frames that may be included in the concatenated frame, depending on the sizes of the VLAN tag fields to be deleted, in comparison with the "different DA concatenation" scheme, and thus may increase the MAC frame transmission efficiency.

<MAC Frame Concatenation Based on VID and DA Concatenation Scheme>

The MAC frame concatenation based on the "VID and DA concatenation" scheme will be described next. In the "VID and DA concatenation" scheme, the MAC frames having the same VID (ULAN ID) and the same DA are collected to execute the MAC frame concatenation.

Differences from the above "different DA concatenation" scheme will be mainly described. In the egress-side MAC processing unit 30 illustrated in FIG. 5, the processes performed by the FCS check unit 31, the frame length check unit 32 and the frame length insertion unit 33 are similar to the "different DA concatenation" scheme. In contrast, the concatenation type selection unit 34 sends the MAC frame received from the frame length insertion unit 33, to the VID and DA concatenation type insertion unit 35C, according to an instruction to execute the "VID and DA concatenation" scheme, from the CPU 21.

The VID and DA concatenation type insertion unit 35C inserts the concatenation code "11" indicating "VID and DA concatenation" into the predetermined position in the MAC frame, and stores the MAC frame into the management table T3. Then, as the management table (buffer) T3, one or more management tables (buffers) T3 are prepared for each VID and DA, or a different temporary storage area is prepared for each VID and DA.

The deletion unit 36 reads out the plurality of MAC frames (having the same VID and the same DA) depending on the concatenated frame size (not exceeding the maximum size of the concatenated frame) from one management table (buffer) T3, based on the instruction from the generation unit 37. Subsequently, the deletion unit 36 deletes the DA field and the VLAN tag field included in each MAC frame to be located at the second or subsequent position, in the plurality of read-out MAC frames, and leaves the DA field and the VLAN tag field of the MAC frame to be located at the beginning (at the first position) of the concatenated frame.

Figure 14:
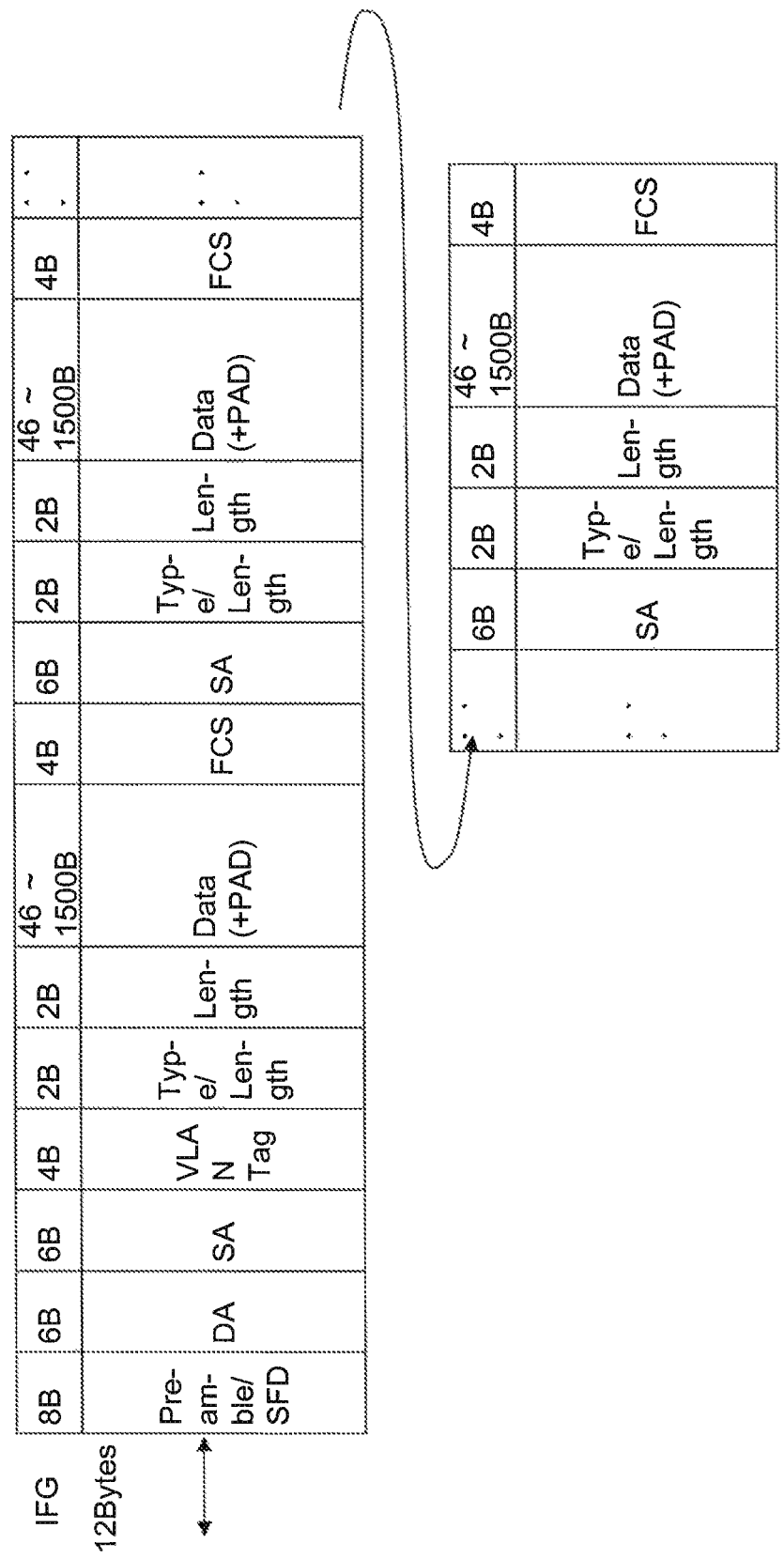
FIG. 14 illustrates a format of a concatenated frame generated by a "VID and DA concatenation" scheme.

The generation unit 37 generates the concatenated frame according to the "VID and DA concatenation" scheme. FIG. 14 illustrates a format of the concatenated frame generated by the "VID and DA concatenation" scheme.

A difference between the concatenated frame format illustrated in FIG. 14 and the format in the "VID concatenation" scheme (FIG. 13) is that, in addition to the VLAN tag field, the DA field has also been deleted from each of the MAC frame portions located at the second and subsequent positions. Accordingly, the "VID and DA concatenation" scheme may allow for the improvement in the transmission efficiency depending on the sizes of the DA fields and the VLAN tag fields to be deleted, in comparison with the "different DA concatenation" scheme and the "VID concatenation" scheme.

An operation example of the egress-side MAC processing unit 30 in the "VID and DA concatenation" scheme will be described below using FIG. 9. In step S7 of FIG. 9, when the concatenation type is determined to be "VID and DA concatenation," the concatenation code "11" is inserted into the MAC frame by the VID and DA concatenation type insertion unit 35C in step S16.

Then, the MAC frame is classified into each VID and DA (step S17), and temporarily stored in the management table (buffer) T3 corresponding to the VID and the DA. Then, when receiving the readout instruction from the generation unit 37, the deletion unit 36 reads out the MAC frames (having the same VID and the same DA) of the number depending on the concatenated frame size, from the management table (buffer) T3, and deletes the DA field and the VLAN tag field from each MAC frame to be placed at the second or subsequent position in concatenated frame (step S18). The DA field and the VLAN tag field of the MAC frame to be placed at the beginning (at the first position) in the concatenated frame, however, are not deleted. The plurality of MAC frames are given to the generation unit 37.

The generation unit 37 generates the concatenated frame having the format illustrated in FIG. 14, according to the "VID and DA concatenation" scheme (step S8). The subsequent process in and after step S9 (the insertion of the FCS) is similar to the "different DA concatenation" scheme.

The ingress-side MAC processing unit 40 in the "VID and DA concatenation" scheme will be described next. In the ingress-side MAC processing unit 40 illustrated in FIG. 10, when the concatenation type determination unit 42 determines that the concatenation type is "VID and DA concatenation," the concatenation type determination unit 42 inputs the concatenated frame into the VID and DA division unit 43C.

A process performed by the VID and DA division unit 43C is different from the process performed by the different DA division unit 43D in the "different DA concatenation" scheme, in the following points. In the "VID and DA concatenation" scheme, the DA field and the VLAN tag field are not included in each of the second and subsequent MAC frame portions in the concatenated frame.

Hence, a value increased by the DA field and the VLAN tag field that have been deleted (10 bytes) is stored as the frame length stored in the "Length" field of each of the second and subsequent MAC frame portions.

Accordingly, in order to obtain the beginning position, that is, the start position of the SA field, of each of the third and subsequent MAC frame portions, the VID and DA division unit 43C regards a value obtained by subtracting 10 bytes from the field length in the "Length" field of the immediately preceding MAC frame portion, as the frame length of the immediately preceding MAC frame portion, and obtains the start position of the SA field of the next MAC frame portion.

Of course, the above process is not required, for example, when a configuration is employed in which 10 bytes are subtracted from the field length in the "Length" field in response to the deletion of the DA field and the VLAN tag field by the deletion unit 36 in the MAC processing unit 30. Such a process for changing the field length may be executed in the deletion unit 36 or the generation unit 37.

An operation example of the ingress-side MAC processing unit 40 in the "VID and DA concatenation" scheme will be described below using FIG. 11. In step S006 illustrated in FIG. 11, when the concatenation type is determined to be "VID and DA concatenation," the concatenated frame is sent from the concatenation type determination unit 42 to the division unit 43C (step S025).

The division unit 43C detects the frame length in the "Length" field of the first MAC frame portion (at the first position) in the concatenated frame (step S026). Subsequently, the division unit 43C identifies the end position of the FCS field in the first MAC frame in the concatenated frame, and separates the MAC frame portion (unit block) at the end position (step S027).

The division unit 43C passes the unit block to the restoration unit 44. The restoration unit 44 determines whether or not to restore the VID and the DA, based on whether or not the passed unit block is the first MAC frame portion (step S028). Then, when the unit block is the first MAC frame portion, the process advances to step S030, where it is determined whether or not the next MAC frame portion (the remaining portion of the concatenated frame) exists.

The determination in step S030 is performed in the division unit 43C. Accordingly, the process in steps S026, S027 and S030 is performed in the division unit 43C, while the process in steps S028 and S029 is performed in the restoration unit 44. The processes in the both units may thus not be performed in the order of the flow, and for example, the process in step S028 and the process in step S030 may be executed in parallel.

When the next MAC frame portion (the remaining portion of the concatenated frame) exists, the process returns to step S026, where the frame length in the "Length" field located closest to the beginning of the remaining portion of the concatenated frame is detected, and based on this frame length, the separation (the position of the separation) is determined, and the unit block separation process is performed (step S027).

As described above, since the DA fields and the VLAN tag fields have been deleted from the second and subsequent MAC frame portions, the value obtained by subtracting the DA field length and the VLAN tag field length (10 bytes) from the frame length is used to determine the start position of the SA field of the next MAC frame portion (the position of the separation of the next unit block).

Since the DA fields and the VLAN tag fields have been deleted from the second and subsequent MAC frame portions (unit blocks), the restoration unit 44 replicates the value of the DA field (the destination MAC address) and the value of the VLAN tag field (the VID) in the first MAC frame portion (unit block) (at the first position), and attaches the replicated values to each of the second and subsequent unit blocks (step S029). The DA fields and the VLAN tag fields are thus restored in the unit blocks.

According to a loop process in steps S026 to S030, the plurality of unit blocks are generated in which the DA fields and the VLAN tag fields have been restored if necessary. The frame length deletion unit 45 deletes the "Length" field from each of the plurality of unit blocks (step S010). Then, the process similar to the "different DA concatenation" scheme is performed (steps S011 and S012).

The concatenated frame that may be handled as the standard MAC frame may thus also be generated in the "VID and DA concatenation" scheme. Moreover, the "VID and DA concatenation" scheme may increase the number of MAC frames that may be included in the concatenated frame, depending on the sizes of the DAs and the VLAN tag fields to be deleted, in comparison with the "different DA concatenation" scheme, and thus may increase the transmission efficiency.

In the configuration example of the L2 switch (a relay apparatus or the communication apparatus) described using FIG. 4, the switch 24 may be realized, for example, with a semiconductor memory. Moreover, each of the PHY chip 25 and the MAC chip 26 may be realized with a special-purpose or general-purpose integrated circuit (hardware) such as an Application Specific Integrated Circuit (ASIC) or a Field Programmable Gate Array (FPGA), or a combination thereof.

Each component of the egress-side MAC processing unit 30 described using FIG. 5 and the ingress-side MAC processing unit 40 described using FIG. 10 may be realized with an ASIC, an FPGA or a combination thereof. The management table (buffer) is created on a storage area of a storage (for example, a semiconductor memory or a flash memory) included in the MAC chip 26.

In the example illustrated in FIG. 4, an example has been illustrated in which the egress-side MAC processing unit 30 and the ingress-side MAC processing unit 40 are installed in one MAC chip 26. The egress-side MAC processing unit 30 and the ingress-side MAC processing unit 40 may be implemented in different chips. Moreover, the configurations of the egress-side MAC processing unit 30 and the ingress-side MAC processing unit 40 are by way of illustration, and each of the egress-side MAC processing unit 30 and the ingress-side MAC processing unit 40 may be realized with one or more integrated circuits.

Advantageous Effects of Embodiment

According to the above described embodiment, advantageous effects may be obtained as follows. When a MAC frame of 64 bytes is transmitted, for example, the sending efficiency for the physical band of the MAC frame is as follows.

$$64/(64+12+8) \approx 0.76$$

In contrast, when 100 MAC frames of 64 bytes each are concatenated based on the above "different DA concatenation" scheme, the sending efficiency is as follows.

$$[(64+2) \times 100]/[(64+2) \times 100+12+8] \approx 0.99697$$

Accordingly, the sending efficiency may be increased to 99%.

Moreover, the L2 switch 13 (14) is assumed to include 48 1-Gbps downlink lines and four 10-Gbps uplink lines. Under this assumption, when the frame size of the standard MAC frame is 64 bytes, the maximum available band on the downlink side is as follows.

$$48 \times 0.76 = 36.48 \text{ [Gbps]}$$

In contrast, when the frame size of the standard MAC frame is 64 bytes, the maximum available band on the uplink side is as follows.

$$40 \times 0.76 = 30.4 \text{ [Gbps]}$$

In contrast, when the above "different DA concatenation" scheme is applied, the maximum available band on the uplink side is as follows.

$$40 \times 0.99697 = 39.8788$$

Accordingly, when the MAC frame concatenation is not performed, the uplink lines cannot accommodate 1 Gbps×48 bands. The bands on the downlink lines, however, may be accommodated by generating the concatenated frame according to the "different DA concatenation" scheme.

Moreover, when the above "DA concatenation" scheme is applied, the plurality of MAC frames having the same DA are bundled (concatenated) in a state where the DA field is left only in the first MAC frame portion (at the first position) in the concatenated frame.

When the "different DA concatenation" scheme is used to concatenate 100 MAC frames of 64 bytes each, the frame size is 6600 bytes. In contrast, the "DA concatenation" scheme is used to generate the 6600-byte concatenated frame as follows.

$$(6600-6)/(64+2-6)=109.9$$

In other words, it means that 109.9 MAC frames are concatenated, which corresponds to an improvement in the efficiency by 9.9% in comparison with the "different DA concatenation" scheme.

Attachment of the VLAN tag to a 64-byte MAC frame results in 68 bytes. Then, the sending efficiency is about 77% as follows.

$$68/(68+12+8) \approx 0.773$$

In contrast, when the "VID concatenation" scheme is used to bundle (concatenate) 100 MAC frames having the same VID, the sending efficiency is as follows.

$$(68+64 \times 99)/(68+64 \times 99+12+8) \approx 0.997$$

The sending efficiency may thus be increased to 99%.

Furthermore, if the "VID and DA concatenation" scheme is used to bundle 100 MAC frames having the same DA and the same VID, the sending efficiency may be increased to about 99% as follows.

$$[68+(64-6) \times 99]/[68+(64-6) \times 99+12+8] \approx 0.997$$

Figure 15:
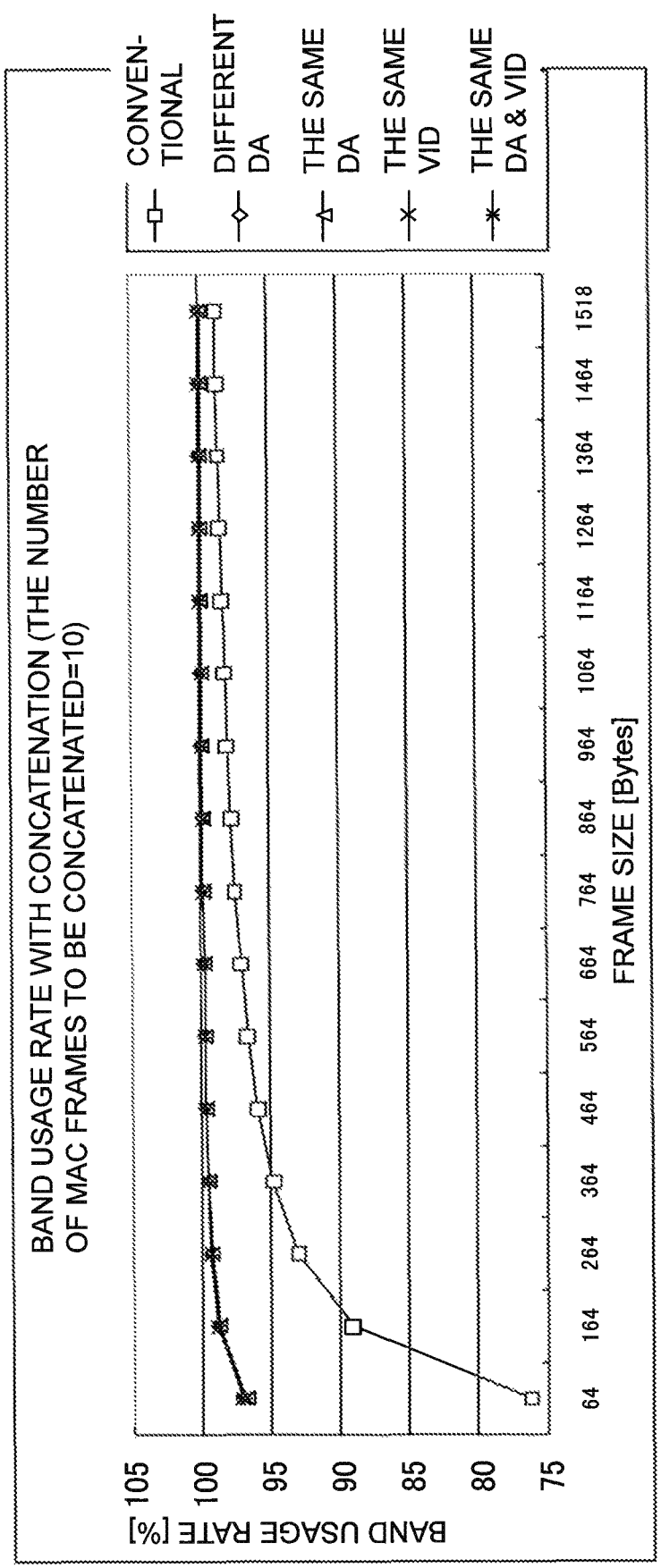
FIG. 15 illustrates a band usage rate on a physical line when MAC frames are concatenated. The horizontal axis indicates a frame size, while the vertical axis indicates the band usage rate. The number of frames to be concatenated is 10.

FIG. 15 illustrates a band usage rate in the case where 10 MAC frames are concatenated. While the usage rate varies depending on the frame size, an improvement by up to about 20% may be seen in comparison with the conventional scheme without concatenation.

Figure 16:
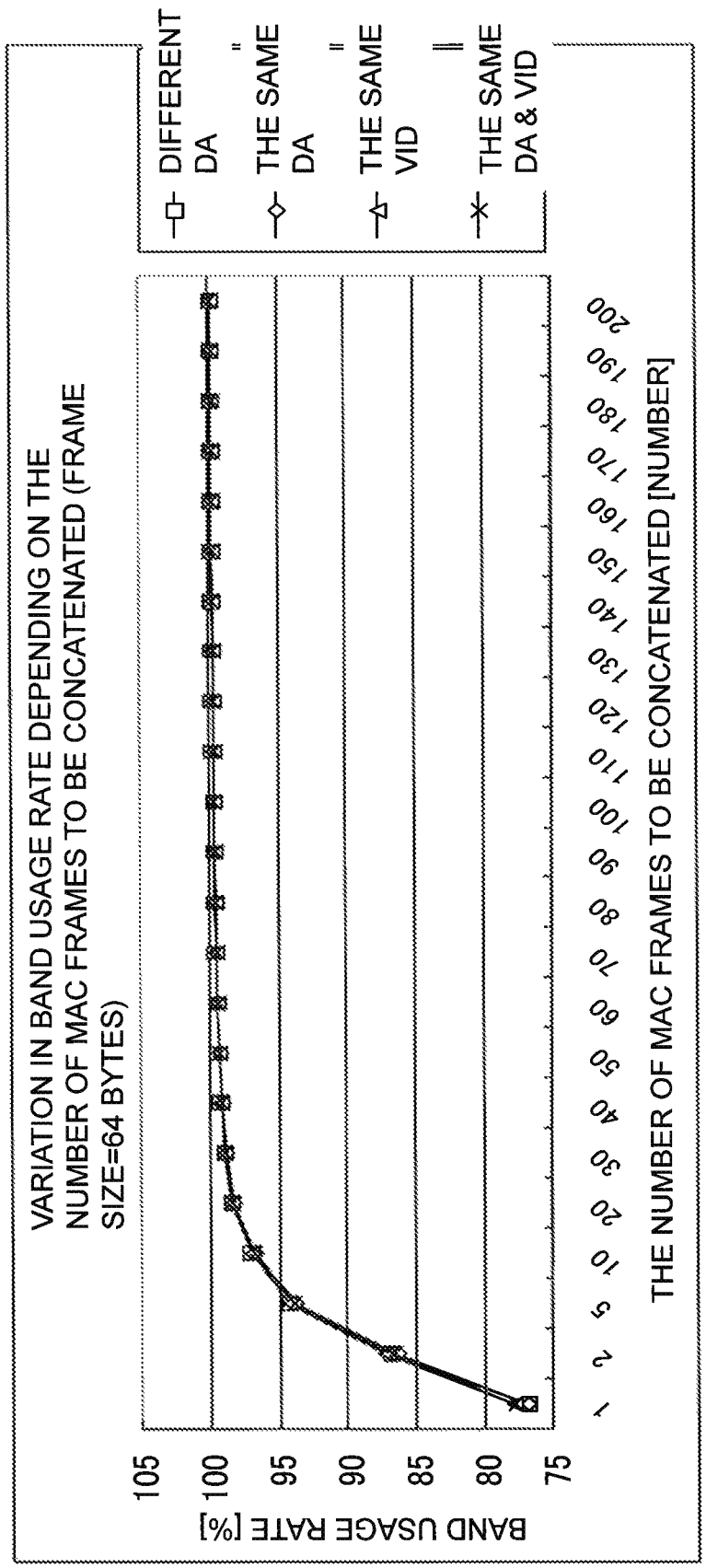
FIG. 16 illustrates a variation in the band usage rate on the physical line depending on the number of MAC frames to be concatenated. The horizontal axis indicates the number of MAC frames to be concatenated, while the vertical axis indicates the band usage rate. The frame size is assumed to be 64 bytes.

FIG. 16 illustrates a variation in the band usage rate depending on the number of MAC frames to be concatenated. In FIG. 16, the frame size of the MAC frame stabilizes at 64 bytes. With the concatenation, an improvement in the band usage rate close to 100% may be seen in comparison with the conventional scheme without concatenation (the number of MAC frames to be concatenated is one).

<Modification>

As described above, the concatenated frame may be handled as the standard MAC frame by regarding the field portions of the DA, the SA, (the VLAN tag) and the Type/Length included in the first MAC frame portion in the concatenated frame, as a MAC frame header, and regarding an area immediately after the Type/Length field and immediately before the last FCS field, as the data portion. Then, the size of the data portion of the concatenated frame is set as the frame length in the Type/Length field of the first MAC frame portion.

Since the upper limit of the size of the data portion, however, is 1500 bytes in the standard MAC frame format, a concatenated frame having the data portion size of 1500 bytes or less may be handled similarly to the standard MAC frame. In this case, for example, when the upper limit of the data portion size of the concatenated frame is 1500 bytes, 22 MAC frames of 64 bytes each may be concatenated.

$$(64+2) \times 22+12+8=1472 \text{ bytes}$$

In contrast, when the MAC frames are not concatenated, 84 bytes (64+12+8) are required per MAC frame, and thus the number of MAC frames transmittable on the same band stays at 17. Accordingly, even in operation where the upper limit of the data portion size of the concatenated frame is 1500 bytes, it is possible to allow for the improvements in the sending efficiency (transmission efficiency) and the band usage rate.

While the concatenation process and the restoration process are performed by the CPU 21 and the MAC device 26 in the embodiment, the MAC device 26 may include functions of the CPU 21 to execute the concatenation process and the restoration process as described above, by the MAC device 26 itself.

Moreover, in the embodiment, the L2 switch has been described in which the egress-side MAC processing unit 30 functions as a frame concatenation apparatus, while the ingress-side MAC processing unit 40 functions as a frame restoration device. The frame concatenation apparatus and the frame restoration device are also applicable to a communication apparatus that controls the MAC frame transfer, such as a switching HUB. Moreover, the frame concatenation apparatus and the frame restoration device may also be applied to (installed in) a terminal apparatus that transmits and receives MAC frames, in addition to a relay apparatus such as the L2 switch or the switching HUB. Moreover, installation of both of the frame concatenation apparatus and the frame restoration device into one communication apparatus (one relay apparatus or one terminal apparatus) is not an essential requirement. Accordingly, one of the frame concatenation apparatus and the frame restoration device may be installed in the communication apparatus.

Moreover, in the embodiment, while the example has been described in which the concatenation code is inserted into each of the plurality of MAC frames included in the concatenated frame, it is sufficient to include the concatenation code inserted into one part of the concatenated frame. Accordingly, for example, the concatenation code may also be inserted only into the Length field of any MAC frame portion (for example, the first MAC frame portion) in the concatenated frame. In this case, for example, only the first Length field may have 2 bytes, while the sizes of the Length fields of other MAC frames may be smaller.

Second Embodiment

A second embodiment of the present invention will be described below. The second embodiment includes components common to the first embodiment. The second embodiment will thus be described mainly in terms of differences from the first embodiment. The components common to the first embodiment are assigned the same reference numerals, and descriptions thereof will be omitted.

As described above, in the standard MAC frame format, the upper limit size of the data portion is 1500 bytes, and the upper limit size of the frame length representable in the Type/Length field is 1500 [bytes]. Accordingly, when a size (frame length) of the concatenated frame larger than 1500 bytes is written into the Type/Length field, a general-purpose L2 switch according to the standard MAC transfer protocol cannot recognize the value of this Type/Length field as the frame length.

In the second embodiment, a frame concatenation apparatus and a frame restoration device for solving the above problem will be described. The frame concatenation apparatus and the frame restoration device in the second embodiment may be installed as the egress-side MAC processing unit and the ingress-side MAC processing unit in the MAC chip (MAC device) 26, respectively, similarly to the first embodiment.

Figure 17:
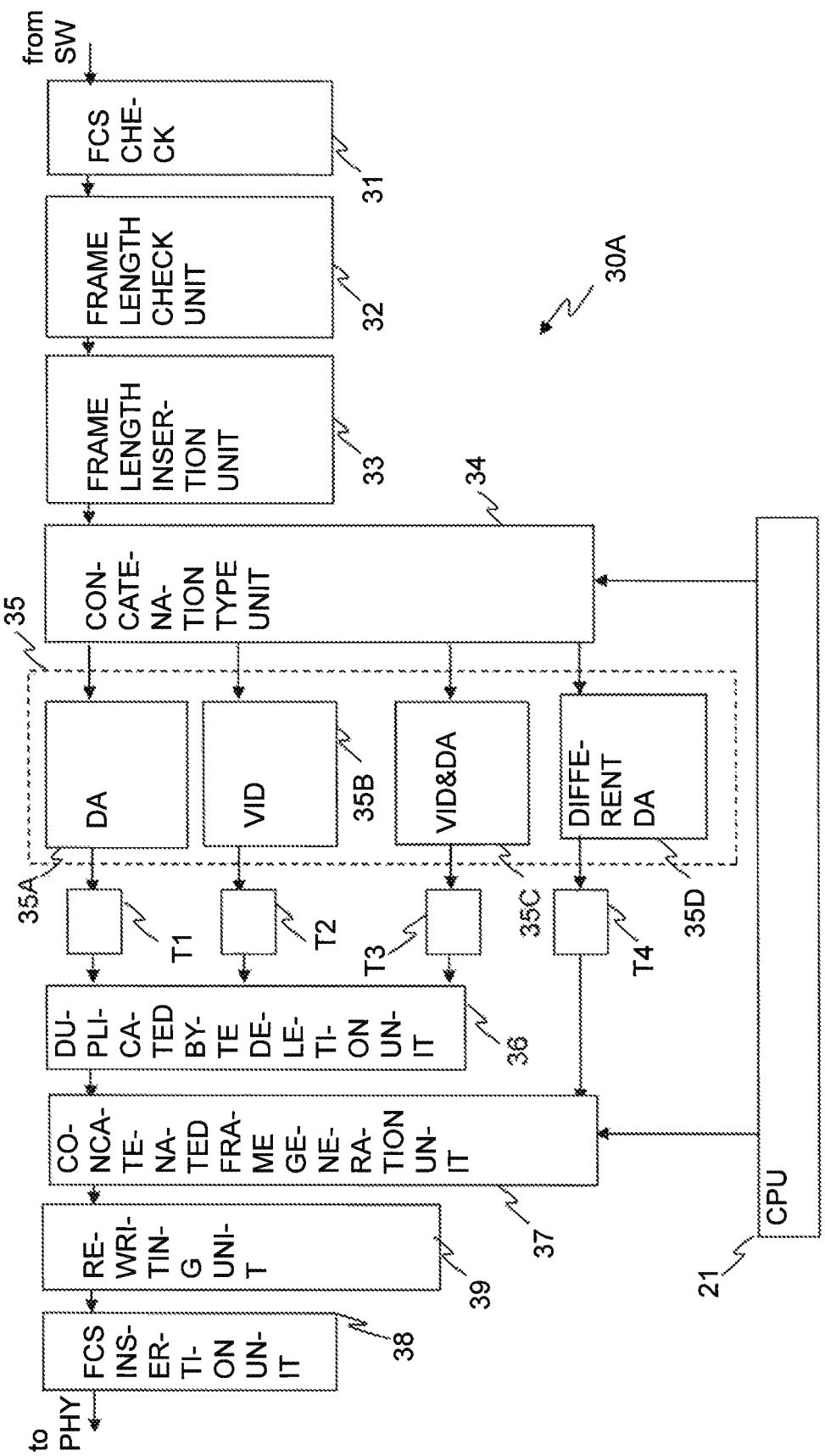
FIG. 17 illustrates a configuration example of the egress-side MAC processing unit in a second embodiment.

FIG. 17 illustrates a configuration example of the egress-side MAC processing unit in the second embodiment. An egress-side MAC processing unit 30A in FIG. 17 is different from the egress-side MAC processing unit (FIG. 5) in the first embodiment, in the following points.

In other words, in the egress-side MAC processing unit 30A, a rewriting unit 39 is inserted between the generation unit 37 and the FCS insertion unit 38. The rewriting unit 39 checks the value of the Type/Length field included in the first MAC frame portion (hereinafter, referred to as "first frame (first MAC frame)") in the concatenated frame generated by the generation unit 37.

The rewriting unit 39 does not perform any particular process when the value of the Type/Length field is a value indicating the type of the upper layer protocol. In contrast, when the value of the Type/Length field is a value indicating the size (frame length) of the MAC frame, the rewriting unit 39 analyzes the upper layer protocol in the first frame. As a result of the analysis, when the class (type) of the upper layer protocol is found, the rewriting unit 39 rewrites the value of the Type/Length field, with the value (Type value) indicating the type of the upper layer protocol.

The analysis of the upper layer protocol, for example, may be realized by analyzing a upper layer protocol header stored in the data portion of the first frame in the concatenated frame.

According to such a rewriting process, even if the frame length (frame size) of the concatenated frame exceeds the value representable in the Type/Length field of the first frame (1500 bytes in the standard MAC format), the value of the Type/Length field of the concatenated frame would be interpreted as the Type value of the upper layer protocol by an apparatus receiving the concatenated frame.

Accordingly, the concatenated frame may be handled as a normal MAC frame in a receiving communication apparatus (for example, the general-purpose L2 switch or the switching HUB) even if the size of the concatenated frame exceeds the value representable in the Type/Length field. In other words, the concatenated frame may be transmitted to its destination via the general-purpose L2 switch or the switching HUB.

FIG. 18 illustrates a data structure example of the "Length" field in the second embodiment. Unlike the "Length" field (FIG. 7) in the first embodiment, the third bit (bit b2) is handled as rewrite information indicating whether or not the value of the Type/Length field of the first frame (first MAC frame) in the concatenated frame has been rewritten with the Type value.

Specifically, when the bit b2 is "0," the bit indicates that the rewrite with the Type value has not been performed. When the bit b2 is "1," the bit indicates that the rewrite with the Type value has been performed.

The bits b3 to b15 indicate the frame length (frame size) of the MAC frame. Since the bits b3 to b15 are 13 bits, the frame size up to 8192 bytes may be represented in the second embodiment.

A process for restoring the plurality of MAC frames from the concatenated frame at the receiver of the concatenated frame refers to only the bit b2 of the Length field of the first frame. The bit b2 of the Length field inserted into each of the second and subsequent MAC frame portions is thus not substantially used. The data structure (FIG. 7) described in the first embodiment is thus also applicable to the Length field of each of the second and subsequent MAC frame portions, except the first frame.

Figure 19:
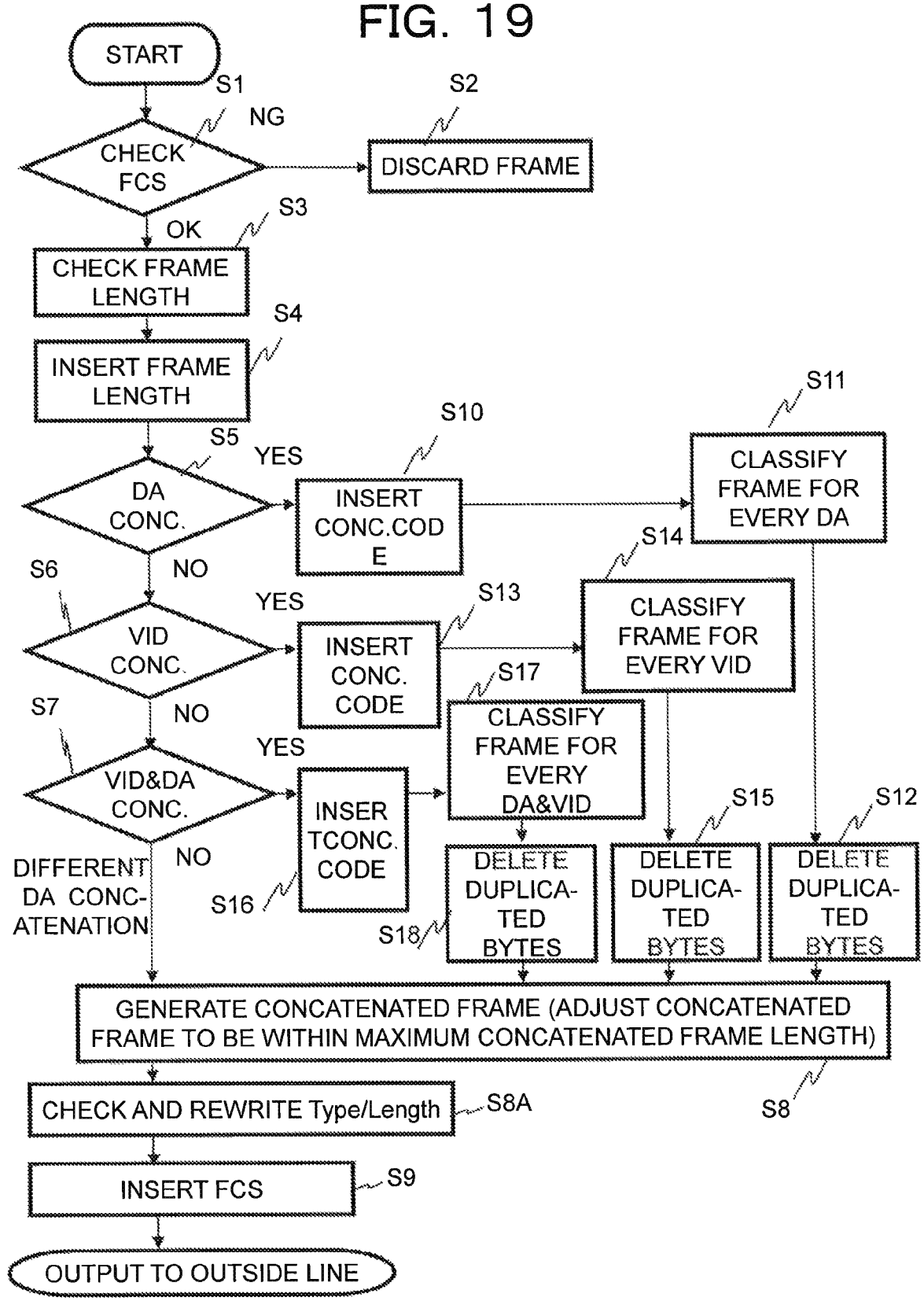
FIG. 19 is a flowchart illustrating an operation example of the egress-side MAC processing unit in the second embodiment.

FIG. 19 is a flowchart illustrating an operation example of the egress-side MAC processing unit in the second embodiment. A difference from the first embodiment is that the process performed by the rewriting unit 39 is inserted as step S8A between step S8 and step S9.

In step S8A, the rewriting unit 39 receives the concatenated frame from the generation unit 37. The rewriting unit 39 refers to the value of the Type/Length field of the first frame in the concatenated frame, and determines whether the field value indicates the frame length (frame size) or the Type value.

Then, when the Type/Length field value indicates the Type value, the rewriting unit 39 does not perform any particular process, and passes the concatenated frame to the FCS insertion unit 38. In contrast, when the Type/Length field value indicates the frame size, the rewriting unit 39 analyzes the upper layer protocol type, and rewrites the Type/Length field value with the Type value indicating the upper layer protocol type obtained as the result of the analysis. The rewriting unit 39 further sets the value of the bit b2 in the Length field of the first frame to "1." Then, the rewriting unit 39 passes the concatenated frame to the FCS insertion unit 38.

The configuration and operations of the egress-side MAC processing unit 30A, except those described above, are similar to the configuration and operations of the egress-side MAC processing unit 30 in the first embodiment.

Figure 20:
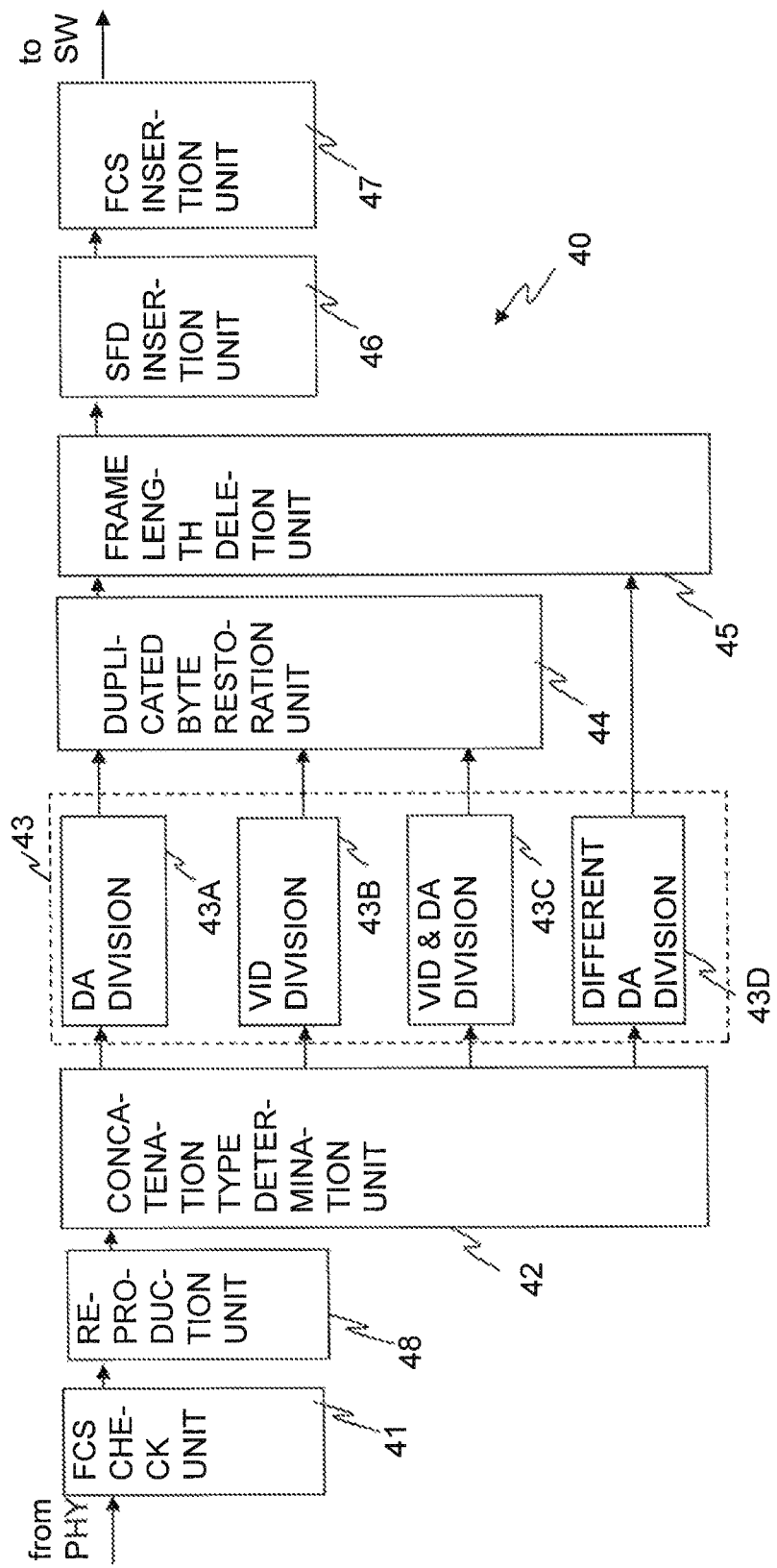
FIG. 20 illustrates a configuration example of the ingress-side MAC processing unit in the second embodiment.

FIG. 20 illustrates a configuration example of the ingress-side MAC processing unit in the second embodiment. An ingress-side MAC processing unit 40A in FIG. 20 is different from the ingress-side MAC processing unit (FIG. 10) in the first embodiment, in the following points.

In other words, in the ingress-side MAC processing unit 40A, a reproduction unit 48 is inserted between the FCS check unit 41 and the concatenation type determination unit 42. The reproduction unit 48 checks the value of the bit b2 included in the Length field in the concatenated frame received from the FCS check unit 41.

When the bit b2 is "0," the reproduction unit 48 assumes that the Type/Length field included in the first frame has not been rewritten (the original value is the Type value), and passes the concatenated frame to the concatenation type determination unit 42 without performing a reproduction process. In other words, the reproduction unit 48 causes the concatenated frame to directly pass through it.

In contrast, when the bit b2 is "1," in which the Type/Length field included in the first frame has been rewritten (the Length value has been rewritten with the Type value), the reproduction unit 48 performs the reproduction process.

In other words, the reproduction unit 48 obtains the value of the Length value (frame size) stored in the Length field of the first frame, and rewrites the value of the Type/Length field with the obtained value. The value of the Type/Length field thereby returns to the original Length value. Then, the reproduction unit 48 passes the concatenated frame to the concatenation type determination unit 42.

Figure 21:
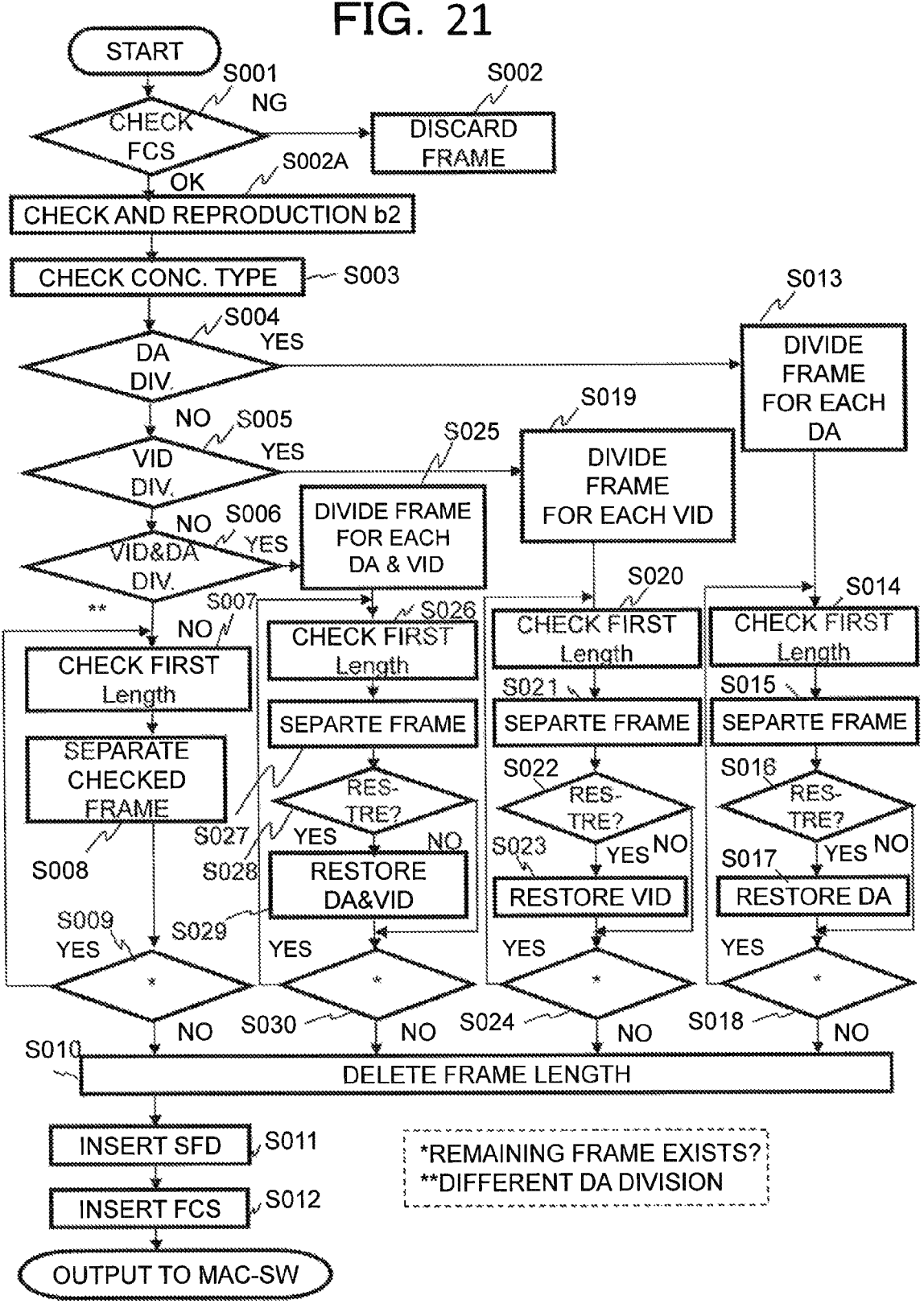
FIG. 21 is a flowchart illustrating an operation example of the ingress-side MAC processing unit in the second embodiment.

FIG. 21 is a flowchart illustrating an operation example of the ingress-side MAC processing unit in the second embodiment. A difference from the first embodiment is that the b2 check and the reproduction process performed by the reproduction unit 48 are inserted as step S002A between step S001 and step S003.

In step S002A, the reproduction unit 48 checks the value of the bit b2 in the Length field of the first frame in the concatenated frame received from the FCS check unit 41 (information for determining whether or not the Type/Length field has been rewritten), and determines whether the bit b2 is "0" or "1."

When the bit b2 is "0," the reproduction unit 48 passes the concatenated frame to the concatenation type determination unit 42. In contrast, when the bit b2 is "1," the reproduction unit 48 rewrites the value of the Type/Length field of the first frame, with the value of the frame length (frame size) in the Length field of the first frame. Then, the reproduction unit 48 passes the concatenated frame to the concatenation type determination unit 42.

The configuration and operations of the ingress-side MAC processing unit in the second embodiment, except those described above, are similar to the first embodiment.

According to the second embodiment, the following working effect may be obtained in addition to a working effect described in the first embodiment. In other words, in the communication apparatus that transmits the concatenated frame (the communication apparatus including the frame concatenation apparatus), the rewriting unit 39 determines whether the value of the Type/Length field of the first frame in the concatenated frame indicates the Type value or the Length value. When the value of the Type/Length field is the Length value, the rewriting unit 39 rewrites the Length value with the Type value.

Since the format of the concatenated frame is thereby put into a state according to the standard MAC format, the concatenated frame is handled as a normal MAC frame in a general-purpose L2 switch or a switching HUB that performs standard MAC frame transfer. In other words, the concatenated frame may be sent to its destination via the general-purpose L2 switch or the switching HUB.

In contrast, in the communication apparatus that receives the concatenated frame (the communication apparatus including the frame restoration device), the reproduction unit 48 refers to the bit b2 included in the first frame in the concatenated frame. When the value of the Type/Length field has been rewritten, the reproduction unit 48 rewrites the value of the Type/Length field with the value of the frame length in the Length field of the first frame, and thereby returns the value of the Type/Length field to the original value.

The value of the Type/Length field of the first frame (unit block) to be divided by the division unit 43 (any of the division units 43A to 43D) may thereby be returned to the original value.

According to the embodiments of the present invention, efficient frame transmission is achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A frame concatenation apparatus, comprising:
   a storage configured to store a plurality of frames to be transmitted;
   a generation circuit configured to generate a concatenated frame formed by serially concatenating the plurality of frames read out from the storage, the concatenated frame including frame length information indicating a length of each of the plurality of frames and concatenation type information; and
   an attachment circuit configured to attach information for establishing synchronization with a receiver of the concatenated frame, to the concatenated frame,
   wherein the generation circuit executes one selected from at least two among processes (1) to (4) below:
   (1) a first process for generating a concatenated frame in which any one of a plurality of frames including the same destination information includes the destination information, and the destination information is omitted from each of one or more remaining frames;
   (2) a second process for generating a concatenated frame in which any one of a plurality of frames including the same virtual network identification information includes the virtual network identification information, and the virtual network identification information is omitted from each of one or more remaining frames;
   (3) a third process for generating a concatenated frame in which any one of a plurality of frames including the same destination information and the same virtual network identification information includes the destination information and the virtual network identification information, and the destination information and the virtual network identification information are omitted from each of one or more remaining frames; and (4) a fourth process for generating a concatenated frame in which a plurality of frames each including different destination information are concatenated, and the frame concatenation apparatus further comprises an insertion circuit configured to insert the concatenation type information indicating one of the first to fourth processes executed by the generation circuit, into the concatenated frame or each of the plurality of frames.

2. The frame concatenation apparatus according to claim 1, wherein each of the plurality of frames includes the same destination information, and the generation circuit generates the concatenated frame in which any one of the plurality of frames includes the destination information, and the destination information is omitted from each of one or more remaining frames.

3. The frame concatenation apparatus according to claim 1, wherein each of the plurality of frames includes the same virtual network identification information, and the generation circuit generates the concatenated frame in which any one of the plurality of frames includes the virtual network identification information, and the virtual network identification information is omitted from each of one or more remaining frames.

4. The frame concatenation apparatus according to claim 1, wherein each of the plurality of frames includes the same destination information and the same virtual network identification information, and the generation circuit generates the concatenated frame in which any one of the plurality of frames includes the destination information and the virtual network identification information, and the destination information and the virtual network identification information are omitted from each of one or more remaining frames.

5. The frame concatenation apparatus according to claim 1, further comprising:

a detection circuit configured to detect each frame length of each of the plurality of frames; and a frame length insertion circuit configured to insert the each detected frame length into each of the frames.

6. The frame concatenation apparatus according to claim 2, wherein any one of the plurality of frames is a frame placed at a beginning of the concatenated frame.

7. The frame concatenation apparatus according to claim 1, wherein the frame is a MAC frame including a type/length field in which one of a Type value indicating a type of an upper layer protocol and a length value indicating a frame length is stored, and the frame concatenation apparatus further comprises a rewriting circuit configured to, when the length value is stored in the type/length field of a MAC frame located at the beginning of the concatenated frame, rewrite this length value with the type value, and to attach rewrite information indicating that the value of the type/length field has been rewritten, to the concatenated frame.

8. A frame restoration device, comprising:

a reception circuit configured to receive a concatenated frame including a plurality of frames serially concatenated and including frame length information indicating a length of each of the plurality of frames and concatenation type information;

a division circuit configured to divide the concatenated frame into the plurality of frames, based on the frame length information and the concatenation type information; and a deletion circuit configured to delete the frame length information and the concatenation type information, the division circuit executes one selected from at least two among processes (1) to (4) below:

(1) a first process for dividing the concatenated frame in a state where any one of the plurality of frames that have been concatenated includes destination information, and the destination information has been omitted from each of one or more remaining frames;

(2) a second process for dividing the concatenated frame in a state where any one of the plurality of frames that have been concatenated includes virtual network identification information, and the virtual network identification information has been omitted from each of one or more remaining frames;

(3) a third process for dividing the concatenated frame in a state where any one of the plurality of frames that have been concatenated includes destination information and virtual network identification information, and the destination information and the virtual network identification information have been omitted from each of one or more remaining frames; and (4) a fourth process for dividing the concatenated frame in which plurality of frames each including different destination information have been concatenated, and the division circuit selects one of the first to fourth processes corresponding to the concatenation type information indicating a process executed by a transmitter of the concatenated frame.

9. The frame restoration device according to claim 8, wherein the concatenated frame is in a state where any one of the plurality of frames includes destination information, and the destination information has been omitted from each of one or more remaining frames, and the frame restoration device further comprises a restoration circuit configured to attach the destination information included in any one of the plurality of frames, to each of the one or more frames that have been divided by the division circuit and do not include the destination information.

10. The frame restoration device according to claim 8, wherein the concatenated frame is in a state where any one of the plurality of frames includes virtual network identification information, and the virtual network identification information has been omitted from each of one or more remaining frames, and the frame restoration device further comprises a restoration circuit configured to attach the virtual network identification information included in any one of the plurality of frames, to each of the one or more frames that have been divided by the division circuit and do not include the virtual network identification information.

11. The frame restoration device according to claim 8, wherein the concatenated frame is in a state where any one of the plurality of frames includes destination information and virtual network identification information, and the destination information and the virtual network identification information have been omitted from each of one or more remaining frames, and the frame restoration device further comprises a restoration circuit configured to attach the destination information and the virtual network identification information included in any one of the plurality of frames, to each of the one or more frames that have been divided by the division circuit and do not include the destination information and the virtual network identification information.

12. The frame restoration device according to claim 8, wherein any one of the plurality of frames is a frame placed at a beginning of the concatenated frame.

13. The frame restoration device according to claim 8, wherein the frame is a MAC frame including a Type/Length field in which one of a Type value indicating a type of an upper layer protocol and a Length value indicating a frame length is stored, and the frame restoration device further comprises a reproduction configured to, when rewrite information indicating that the value of the Type/Length field of a first MAC frame located at the beginning of the concatenated frame has been rewritten is included in the concatenated frame, rewrite the value of the Type/Length field of the first MAC frame based on the frame length information corresponding to the first MAC frame.

14. A communication apparatus, comprising:
a storage configured to store a plurality of frames to be transmitted;
a generation circuit configured to generate a concatenated frame formed by serially concatenating the plurality of frames read out from the storage, the concatenated frame including frame length information indicating a length of each of the plurality of frames and concatenation type information;
an attachment circuit configured to attach information for establishing synchronization with a receiver of the concatenated frame, to the concatenated frame; and
a sending circuit configured to send out the concatenated frame including the information for establishing synchronization attached thereto,
wherein the generation circuit executes one selected from at least two among processes (1) to (4) below:
(1) a first process for generating a concatenated frame in which any one of a plurality of frames including the same destination information includes the destination information, and the destination information is omitted from each of one or more remaining frames;
(2) a second process for generating a concatenated frame in which any one of a plurality of frames including the same virtual network identification information includes the virtual network identification information, and the virtual network identification information is omitted from each of one or more remaining frames;
(3) a third process for generating a concatenated frame in which any one of a plurality of frames including the same destination information and the same virtual network identification information includes the destination information and the virtual network identification information, and the destination information and the virtual network identification information are omitted from each of one or more remaining frames; and
(4) a fourth process for generating a concatenated frame in which a plurality of frames each including different destination information are concatenated, and
the frame concatenation apparatus further comprises an insertion circuit configured to insert the concatenation type information indicating one of the first to fourth processes executed by the generation circuit, into the concatenated frame or each of the plurality of frames.

15. The communication apparatus according to claim 14, wherein the plurality of frames to be stored in the storage are received from one of an uplink and a downlink, and the sending circuit sends out the concatenated frame toward the other one of the uplink and the downlink.

16. A frame concatenation method, comprising:
generating, using a generation circuit, a concatenated frame formed by serially concatenating a plurality of frames to be transmitted, the concatenated frame including frame length information indicating a length of each of the plurality of frames and concatenation type information; and
attaching, using a attachment circuit, information for establishing synchronization with a receiver of the concatenated frame, to the concatenated frame,
wherein the generating executes one selected from at least two among processes (1) to (4) below:
(1) a first process for generating a concatenated frame in which any one of a plurality of frames including the same destination information includes the destination information, and the destination information is omitted from each of one or more remaining frames;
(2) a second process for generating a concatenated frame in which any one of a plurality of frames including the same virtual network identification information includes the virtual network identification information, and the virtual network identification information is omitted from each of one or more remaining frames;
(3) a third process for generating a concatenated frame in which any one of a plurality of frames including the same destination information and the same virtual network identification information includes the destination information and the virtual network identification information, and the destination information and the virtual network identification information are omitted from each of one or more remaining frames; and
(4) a fourth process for generating a concatenated frame in which a plurality of frames each including different destination information are concatenated, and
the frame concatenation method further comprises inserting the concatenation type information indicating one of the first to fourth processes executed by the generating, into the concatenated frame or each of the plurality of frames.

17. A frame restoration method, comprising:
receiving, using a reception circuit, a concatenated frame including a plurality of frames serially concatenated and including frame length information indicating a length of each of the plurality of frames and concatenation type information;
dividing, using a division circuit, the concatenated frame into the plurality of frames, based on the frame length information and the concatenation type information; and
deleting, using a deletion circuit, the frame length information and the concatenation type information indicating a process executed by a transmitter of the concatenation frame,
the dividing executes one selected from at least two among processes (1) to (4) below:
(1) a first process for dividing the concatenated frame in a state where any one of the plurality of frames that have been concatenated includes destination information, and the destination information has been omitted from each of one or more remaining frames;
(2) a second process for dividing the concatenated frame in a state where any one of the plurality of frames that have been concatenated includes virtual network identification information, and the virtual network identification information has been omitted from each of one or more remaining frames;
(3) a third process for dividing the concatenated frame in a state where any one of the plurality of frames that have been concatenated includes destination information and virtual network identification information, and the destination information and the virtual network identification information have been omitted from each of one or more remaining frames; and
(4) a fourth process for dividing the concatenated frame in which plurality of frames each including different destination information have been concatenated, and the dividing selects one of the first to fourth processes corresponding to the concatenation type information indicating a process executed by a transmitter of the concatenated frame.

* * * * *